United States Patent [19]
Birch et al.

[11] Patent Number: 5,757,416
[45] Date of Patent: May 26, 1998

[54] SYSTEM AND METHOD FOR TRANSMITTING A PLURALITY OF DIGITAL SERVICES INCLUDING IMAGING SERVICES

[75] Inventors: Christopher H. Birch, Toronto; Christian V. van Staden, Scarborough; Walter R. Brooks, Georgetown; Paul D. Nicholas, Scarborough; Steven S. Lawrence, Toronto, all of Canada

[73] Assignee: Scientific-Atlanta, Inc., Norcross, Ga.

[21] Appl. No.: 480,922

[22] Filed: Jun. 7, 1995

Related U.S. Application Data

[62] Division of Ser. No. 161,160, Dec. 3, 1993, Pat. No. 5,583,562.

[51] Int. Cl.$^6$ .................................................. H04N 7/16
[52] U.S. Cl. .................... 348/6; 348/10; 455/6.1; 370/474
[58] Field of Search ........................ 348/6, 12, 13, 348/723, 423, 500, 901, 461, 465, 467, 468, 473, 474, 476, 477, 478; 455/5.1, 6.1, 4.2, 3.2; 370/94.2, 94.1, 60, 60.1, 84, 312, 432, 485, 486, 487, 477, 470, 471, 474, 503; H04N 7/16, 7/173

[56] References Cited

U.S. PATENT DOCUMENTS

| | | |
|---|---|---|
| 4,316,219 | 2/1982 | Smith et al. |
| 4,652,903 | 3/1987 | Lucas |
| 4,697,277 | 9/1987 | van Rassel |
| 4,720,873 | 1/1988 | Goodman et al. ............ 348/3 |
| 4,723,283 | 2/1988 | Nagasawa et al. |
| 4,769,833 | 9/1988 | Farleigh et al. |
| 4,787,085 | 11/1988 | Suto et al. |
| 4,809,267 | 2/1989 | Higuchi et al. |
| 4,817,142 | 3/1989 | van Rassel |
| 4,829,569 | 5/1989 | Seth-Smith et al. |
| 4,833,673 | 5/1989 | Chao et al. |
| 4,864,400 | 9/1989 | Kumada et al. |
| 4,866,770 | 9/1989 | Seth-Smith et al. |
| 4,890,321 | 12/1989 | Seth-Smith et al. |
| 4,994,909 | 2/1991 | Graves et al. |
| 5,008,749 | 4/1991 | Ruckert |

(List continued on next page.)

FOREIGN PATENT DOCUMENTS

| | | | |
|---|---|---|---|
| 3621782 A1 | 1/1988 | Germany | H04N 5/06 |
| 5-336400 | 12/1993 | Japan | H04N 5/06 |

*Primary Examiner*—Christopher C. Grant
*Attorney, Agent, or Firm*—Kenneth M. Massaroni; John Victor Pezdek; Kelly A. Gardner

[57] ABSTRACT

A multiplex frame format for transmitting digital data in a data transmission system comprises a PACKETS portion comprising a highly error-protected region and a region having only Reed Solomon encoding as an error protection measure, the PACKETS portion including low speed data. The frame format also comprises portions for transmitting medium (AUDIO) and high speed (VIDEO) data streams following the PACKETS portion. Prior to transmission, the composed frame comprising the PACKETS, AUDIO and VIDEO portions is interleaved and the BLOCK SYNC and FRAME SYNC are added. A multiplex structure control packet word of the PACKETS portion immediately follows FRAME SYNC. Thus, the FRAME SYNC word defines where interleaving begins. A demultiplexer in concert with a microcontroller of a decoder decodes the multiplex structure control word and related PACKETS and outputs digital data streams to related output peripheral processors. The BLOCK SYNC word preferably comprises one eight bit byte and contains network signaling or other data at predetermined bit positions within the word. Moreover, the frame format is flexible and may vary in horizontal and vertical dimensions as digital service streams are varied due to service requirements or priorities. The multiplexers for forming the frame according to the present invention may be arranged in redundant (hot standby) or in multi-service arrangements synchronized by a synchronizing waveform, digitally generated to comprise a continuous 3.375 MHz portion and a single cycle frame marking signal of greater magnitude but significantly lower frequency.

26 Claims, 12 Drawing Sheets

U.S. PATENT DOCUMENTS

| | | |
|---|---|---|
| 5,021,872 | 6/1991 | Shiratsuchi . |
| 5,062,105 | 10/1991 | McKnight et al. . |
| 5,200,823 | 4/1993 | Yoneda et al. . |
| 5,251,217 | 10/1993 | Travers et al. . |
| 5,257,106 | 10/1993 | Maruoka . |
| 5,319,707 | 6/1994 | Wasilewski et al. . |
| 5,400,401 | 3/1995 | Wasilewski et al. . |
| 5,420,640 | 5/1995 | Munich et al. .......................... 348/525 |
| 5,469,448 | 11/1995 | Denissen et al. ....................... 371/37.4 |
| 5,493,339 | 2/1996 | Birch et al. .............................. 348/461 |
| 5,499,241 | 3/1996 | Thompson et al. ......................... 348/6 |
| 5,587,743 | 12/1996 | Montgomery et al. .................... 348/12 |

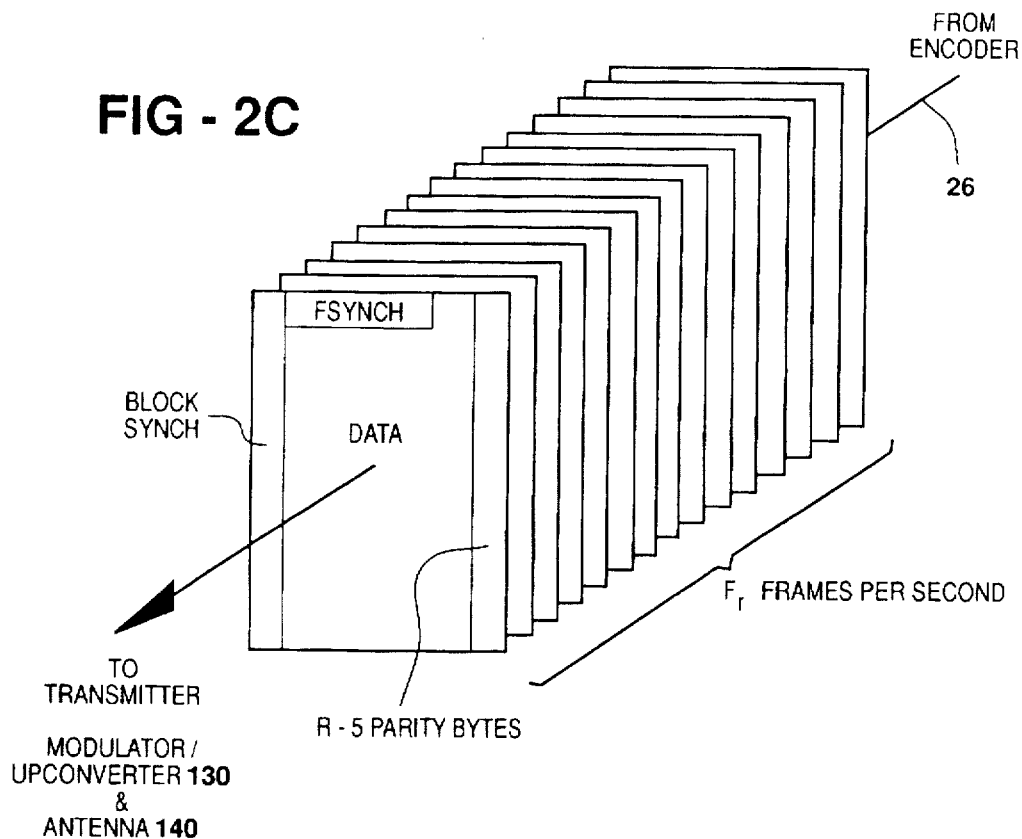
FIG - 2C
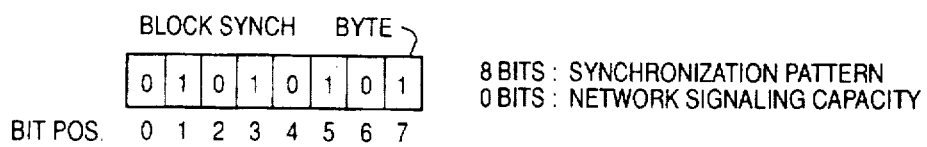
FIG - 2D (1)
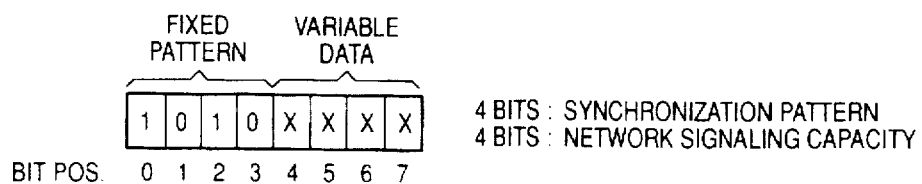
FIG - 2D (2)

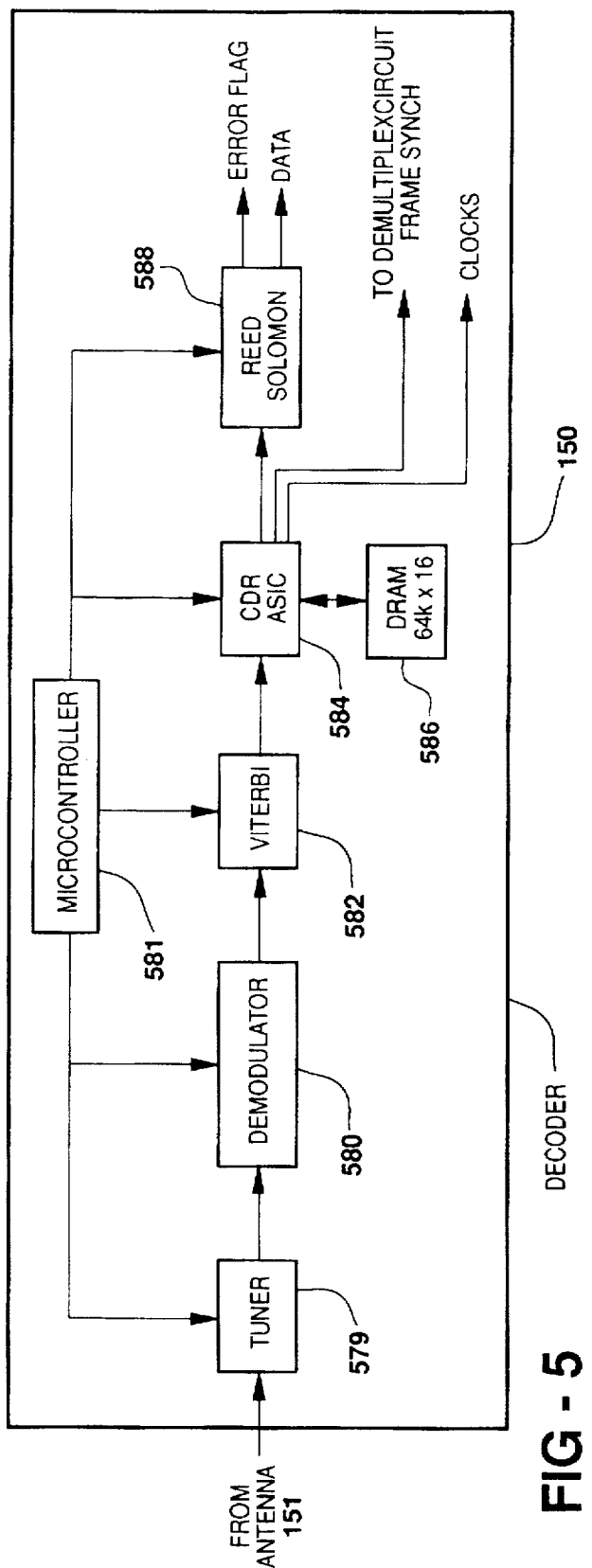
FIG - 5
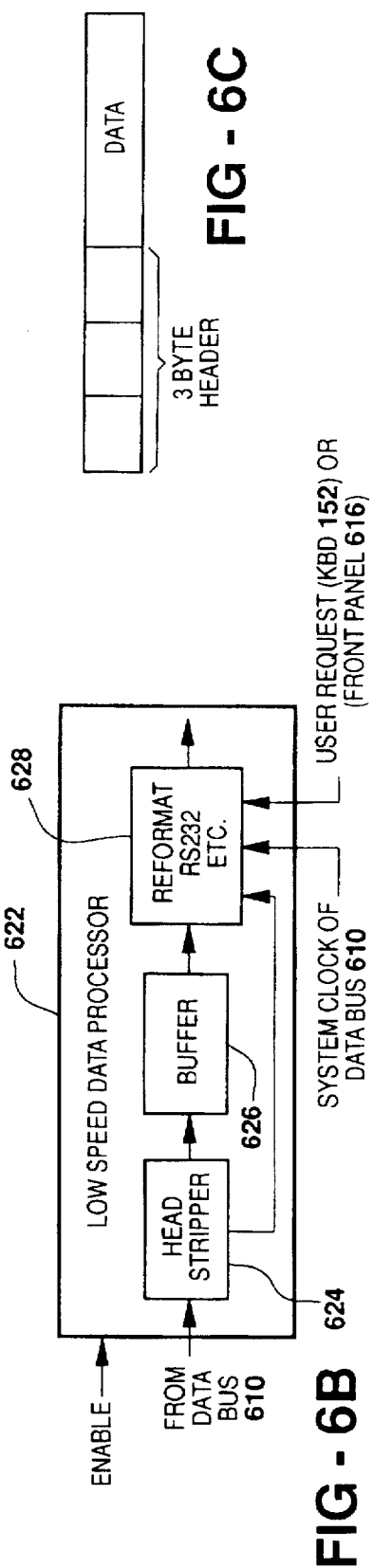
FIG - 6C
FIG - 6B

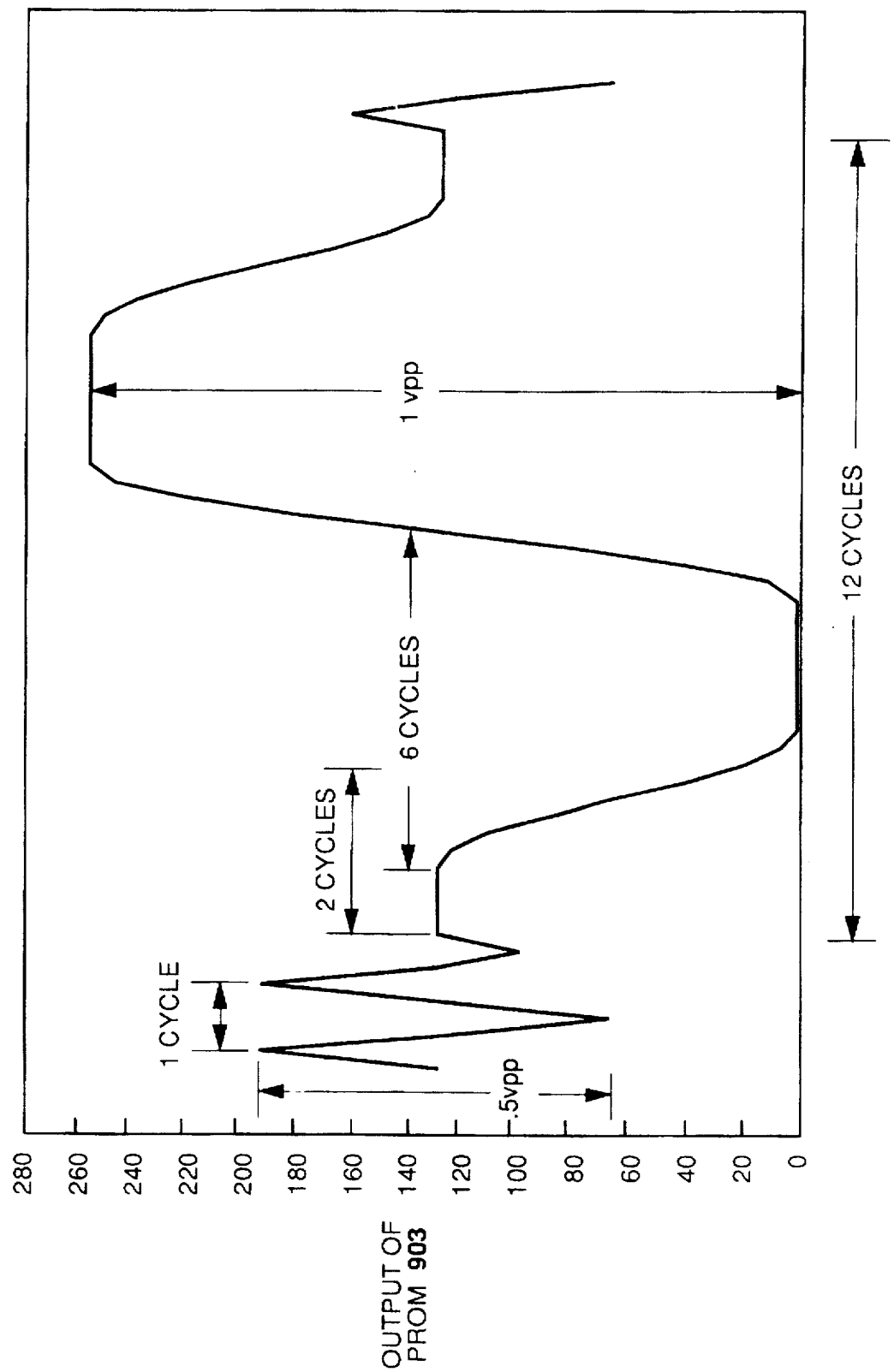

MULTIPLEX STRUCTURE CONTROL PACKET (MSC)

| DESCRIPTION (USES 135 BYTES OF MUX) | BITS (144) |
|---|---|
| STRUCTURE CONTROL TYPE | 8 |
| END OF PACKETS MARKER (ACTUAL BYTE LOCATION) | 17 |
| END OF AUDIO MARKER (ACTUAL BYTE LOCATION) | 17 |
| END OF VIDEO MARKER (ACTUAL BYTE LOCATION) | 17 |
| NUMBER OF 45 BYTE PACKETS INCLUDING FEC (-> 6) | 6 |
| NUMBER OF 75 BYTE PACKETS INCLUDING FEC (-> 10) | 5 |
| NUMBER OF 10 BYTE PACKETS | 5 |
| NUMBER OF 5 BYTE PACKETS | 5 |
| NUMBER OF 32 BYTE PACKETS | 12 |
| NUMBER OF 42 BYTE PACKETS | 12 |
| NUMBER OF BYTES / AUDIO BLOCK | 8 |
| NUMBER OF BYTES / VIDEO BLOCK | 8 |
| NUMBER OF BYTES PER OSP PACKET | 8 |
| CRYPTO-CYCLE COUNT (OF PRESENT FRAME) | 8 |
| CRYPTO-CYCLE LENGTH (50 Hz FRAMES) | 8 |

REGION 1 EXTRA PROTECTION

REGION 2 R - S ONLY

FIG - 10

AUDIO CONTROL PACKET (ACP)

| DESCRIPTION | BITS (48) |
|---|---|
| AUDIO CONTROL PACKET HEADER (100010) | 6 |
| SPARE | 2 |
| NUMBER OF BYTES IN CHANNEL 1 | 4 |
| NUMBER OF BYTES IN CHANNEL 2 | 4 |
| NUMBER OF BYTES IN CHANNEL 3 | 4 |
| NUMBER OF BYTES IN CHANNEL 4 | 4 |
| NUMBER OF BYTES IN CHANNEL 5 | 4 |
| NUMBER OF BYTES IN CHANNEL 6 | 4 |
| NUMBER OF BYTES IN CHANNEL 7 | 4 |
| NUMBER OF BYTES IN CHANNEL 8 | 4 |
| NUMBER OF BYTES IN CHANNEL 9 | 4 |
| NUMBER OF BYTES IN CHANNEL 10 | 4 |

FIG - 11A

AUDIO SERVICE DESCRIPTOR PACKET (ASDP)

| DESCRIPTION | BITS (48) |
|---|---|
| AUDIO SERVICE DECRIPTOR PACKET HEADER (100011) | 6 |
| SPARE | 2 |
| SPARE | 2 |
| AUDIO SERVICE STREAM NUMBER | 6 |
| SPARE | 8 |
| SPARE | 7 |
| NUMBER OF BYTES OF ACTUAL AUDIO DATA | 17 |

FIG - 11B

VIDEO CONTROL PACKET (VCP)

| DESCRIPTION | BITS (48) |
|---|---|
| VIDEO CONTROL PACKET HEADER (100100) | 6 |
| SPARE | 2 |
| NUMBER OF BYTES IN CHANNEL 1 | 8 |
| NUMBER OF BYTES IN CHANNEL 2 | 8 |
| NUMBER OF BYTES IN CHANNEL 3 | 8 |
| NUMBER OF BYTES IN CHANNEL 4 | 8 |
| NUMBER OF BYTES IN CHANNEL 5 | 8 |

FIG - 12A

VIDEO SERVICE DESCRIPTOR PACKET (VSDP)

| DESCRIPTION | BITS (48) |
|---|---|
| VIDEO SERVICE DECRIPTOR PACKET HEADER (100101) | 6 |
| SPARE | 2 |
| SPARE | 3 |
| VIDEO SERVICE STREAM NUMBER | 5 |
| SPARE | 7 |
| HDTV VIDEO OUTPUT | 1 |
| SPARE | 7 |
| NUMBER OF BYTES OF ACTUAL VIDEO DATA | 17 |

FIG - 12B

SYSTEM AND METHOD FOR TRANSMITTING A PLURALITY OF DIGITAL SERVICES INCLUDING IMAGING SERVICES

This application is a division of application Ser. No. 08/161,160, filed Dec. 3, 1993 now U.S. Pat. No. 5,583,562.

This application is related by subject matter to U.S. application Ser. No. 08/160,828, entitled "System and Method for Transmitting a Plurality of Digital Services Including Compressed Imaging Services and Associated Ancillary Data Services", Ser. No. 08/160,841, entitled "Memory Efficient Method and Apparatus for Synch Detection", Ser. No. 08/161,159 entitled "A Multi-Service Data Receiver Architecture", Ser. No. 08/160,830, entitled "System and Method for Transmitting and Receiving Variable Length Authorization Control for Digital Services", Ser. No. 08/160,827, entitled "System and Method for Providing Compressed Digital Teletext Services and Teletext Support Services", Ser. No. 08/160,848, entitled "System and Method for Simultaneously Authorizing Multiple Virtual Channels", and Ser. No. 08/160,839, entitled "Method and Apparatus for Locating and Tracking a QPSK Carrier" filed concurrently herewith.

BACKGROUND OF THE INVENTION

A. Field of the Invention

The present invention relates generally to digital signal transmission, and more particularly, to a system and method for multiplexing a plurality of digital services, including imaging services, for transmission to a plurality of remote locations.

B. Description of the Relevant Art

With the growing trend toward a merger of the previously separate technologies of telecommunications including voice and data telecommunications and television including satellite, broadcast and cable television, there has emerged an increased interest in developing adaptable transmission systems capable of handling any one or more of a collection or plurality of such services. The primary media investigated for providing such services to date comprise, for example, coaxial cable, land-based microwave, called cellular radio, broadcast FM, broadcast satellite and optical fiber, to name a few.

Each media has its own characteristics. For example, comparing cable and satellite for digital data transmission, cable tends to have a medium error rate, but, when errors appear, the errors come in long bursts. Satellite as a media has a pretty poor error rate, primarily due to the requisite weak signal power, and hence, low signal to noise ratio. In satellite, then, the poor error rate is specially corrected utilizing such techniques as convolutional error correctors, not required in a cable environment.

In copending U.S. application Ser. No. 07/968,846 filed Oct. 30, 1992 and entitled "System and Method for Transmitting a Plurality of Digital Services," there is described an encoder for generating a multiplexed data stream carrying services to remote locations via, for example, a satellite or a cable distribution network. The generated data stream comprises a continuous sequence of frames, each frame comprising two fields, and each field comprising a plurality of lines. A first group of lines of a field defines a transport layer and a second group of lines defines a service data region. A feature of the disclosed scheme is the ability to dynamically vary the multiplexed data stream from field to field. A further feature of the disclosed scheme is that the data transmission rate of the multiplexed data stream is related to the frequency of known analog video formats, i.e. frame, field and horizontal line rates.

In copending U.S. application Ser. No. 07/970,918 filed Nov. 2, 1992, entitled "System and Method for Multiplexing a Plurality of Digital Program Services for Transmission to Remote Locations," there is described another system, this for multiplexing a plurality of digital program services comprising a collection of, for example, video, audio, teletext, closed-captioning and "other data" services. According to the disclosed scheme, a plurality of subframe data streams are generated, each having a transport layer region and a program data region. These subframe data streams are then multiplexed together into superframes having a transport layer region and a subframe data region.

While these disclosed transmission systems permit a variety of services to be transmitted over various media to remote locations, there remains a need to provide yet other alternative arrangements more particularly adapted to the wide variety of services that may be offered over various media and permit the end user at the remote location greater flexibility over the data content the user is ultimately enabled to receive. Moreover, such a system should be able to be easily adapted to transmit an increasing number of different services in an increasingly efficient manner, for example, utilizing the same or less bandwidth.

Since such services as high definition color television services, so-called "surround-sound" digital audio services, interactive transactional services for home-shopping, reservations, first-run as well as classic movie programming, software delivery, interactive game, alarm services, energy management and such all involve different bandwidths, data formats and such, there remains a need for flexibility in the overall structure provided for transmitting such services. Moreover, a user should not be presented with an overwhelming number of choices, but should be able, in a user-friendly manner, to select only those services which he is capable of receiving or wants to receive. Ideally, the user should be able to have access to an infinite variety of data services, selectable as he chooses, so that he may, for example, watch a first run movie in so-called high definition accompanied by a "surround-sound" audio in the language of his choice and, at the same time, receive a facsimile or voice communication over the same media. If the user is equipment-limited, for example, to a standard resolution television and a telephone set, the user should be able to fashion the delivery of services to the equipment he owns.

SUMMARY OF THE INVENTION

Briefly stated, the present invention is directed to a system and method for multiplexing a plurality of digital service data streams at varying data rates and transmitting the services from an origination point to a plurality of remote locations. A digital service may comprise a collection selectable by the user from any of a number of low data rate, medium data rate and high data rate services including, but not limited to, video (both standard and high resolution), audio (from monaural to "surround-sound"), and data (from subscription software to video games to high speed database exchanges).

The present invention is described primarily in the context of a pay television system such as a cable television or direct broadcast satellite system (DBS), that typically distribute a variety of program services to subscribers for presentation on home terminal equipment which is the property of the end user or subscriber to the pay services. Such home terminal equipment may comprise video game apparatus, a television signal receiver (either standard or high definition), a home computer, a printer ( either a facsimile or high resolution image printer), a stereo sound system, a telephone (including portable, mobile or stationary), a picture-phone, an energy system or alarm equipment interface, or any other known such apparatus or combination of apparatus. Consequently, the present invention does not only envision the environment of the present invention to be so limited but may also include the telecommunications environment or other fixed or switched one-way or two-way program apparatus. It will be assumed, however, that such services be converted, if not already in digital form, to digital form for transmission over the present system.

A method for transmitting a plurality of digital services including low speed data services, medium speed data services and high speed data services comprises the steps of removing parity, start and stop data from low speed digital data, compressing medium and high speed digital data streams, generating packets data comprising predetermined header data, the packets data including at least a multiplex structure control word and low speed data, forming a data frame comprising rows and columns, the frame formed in accordance with the sequence of packets data including low speed data, medium speed data and high speed data, adding block-coded forward error correction data as necessary with the choice of medium, interleaving the frame by rows and columns and inserting horizontal row (block) and vertical column (frame) synchronization words.

Moreover, the horizontal or block synchronization word, hereinafter referred to as BLOCK SYNC, may comprise from four to eight bits for synchronization and substitute, therein, from zero to four bits of network signalling data at predetermined bit positions in the word. For example, if the horizontal synchronization word is binary and comprises eight bits of alternating one and zero values, then, the network signalling data may comprise four bits at predetermined bit positions, for example, the final four bit positions. In an alternative embodiment, the four bits of network signalling data may be located in a predetermined sequence of bit positions, for example, at even or odd-numbered bit positions of the eight bit synch word.

A multiplex structure control (MSC) word precedes the packets data and comprises counter data for a receiver according to the present invention. Included within the MSC word are an end of packets marker, an end of medium speed data marker and an end of high speed data marker. The MSC word is the first word of the interleaved frame and immediately follows the vertical or frame synchronization word, hereinafter referred to as FRAME SYNC.

Consequently, the present invention permits the transmission of a plurality of services including compressed data streams such as per ISO 11171 or ISO 13818 M.P.E.G. compression standards and low speed data streams efficiently over limited bandwidth and in noisy, error-prone environments. Other features and advantages of the present invention will be more particularly described in the following description of the present invention.

BRIEF DESCRIPTION OF THE DRAWINGS

FIG. 2c is a diagram showing that a sequence of frames in the form of FIGS. 2a or 2b are transmitted to a receiver according to the present invention.

FIGS. 2d(1) and 2d(2) provide alternative embodiments of a one byte horizontal synchronization (BLOCK SYNC) word which may include both synchronization and network signaling data bits therein.

FIG. 5 is a detailed block diagram of a portion of receiver 150 of FIG. 1 showing tuner/demodulator 154 and clock and data recovery 155 in greater detail.

FIG. 6b shows detail of low speed data processor 622 of FIG. 6a; and FIG. 6c shows a typical low speed data packet.

FIG. 8 is a graph of a synchronizing waveform signal for synchronizing apparatus, for example, multiplexers arranged according to FIGS. 7a or 7b.

FIG. 10 is a table showing one example of a multiplex structure control word of PACKETS data according to the present invention which immediately follows vertical synchronization (FRAME SYNC) in a transmitted frame of the present invention.

FIGS. 11a and 11b are tables showing examples of audio control and audio service descriptor words of PACKETS data for describing medium speed (audio) data services included within a particular transmitted frame.

FIGS. 12a and 12b are tables showing examples of video control and video service descriptor words of PACKETS data for describing high speed (video) data services included within a particular transmitted frame.

DETAILED DESCRIPTION OF THE DRAWINGS

Figure 1:
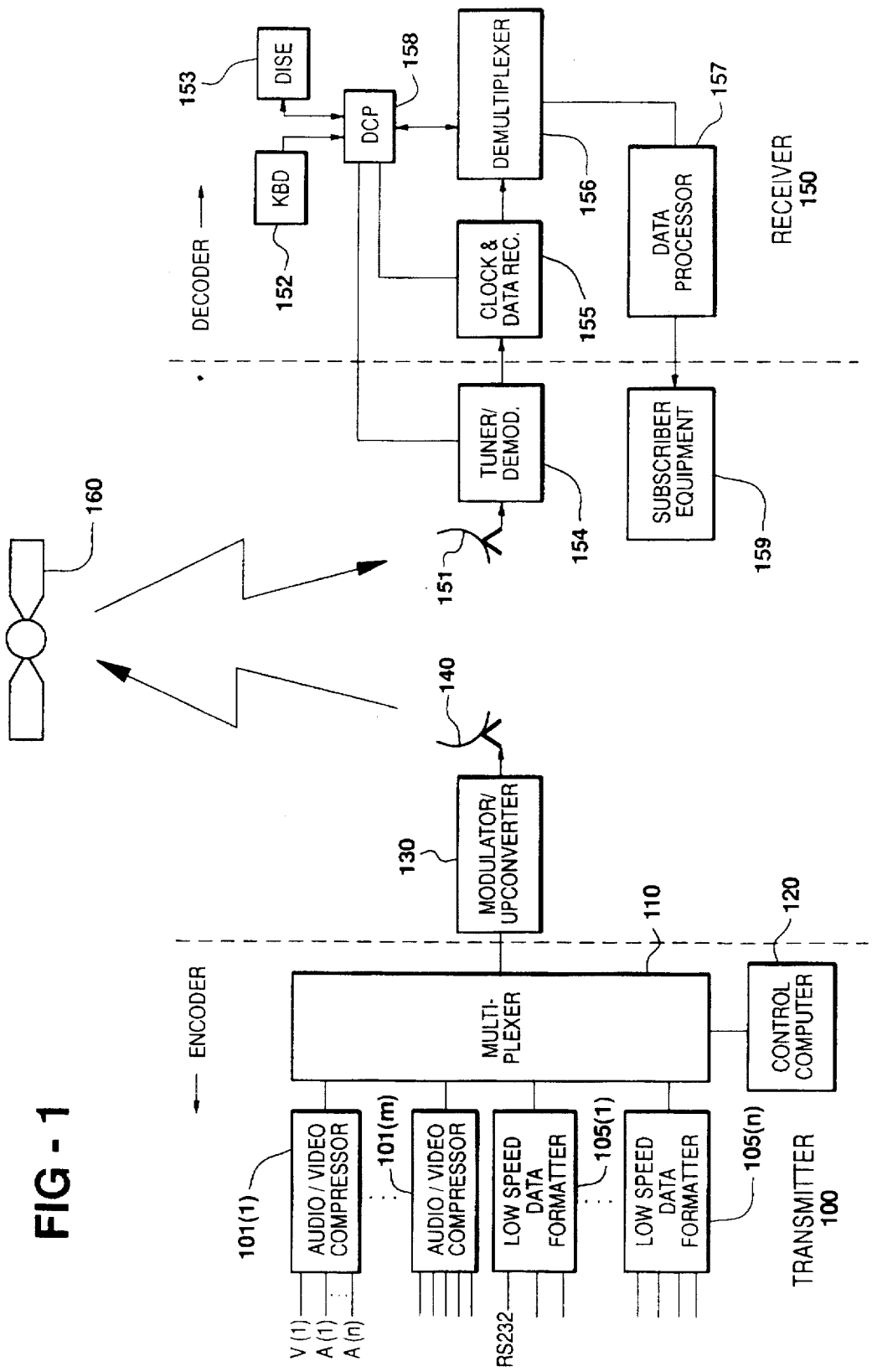
FIG. 1 is a system block diagram showing a transmitter site 100 including an encoder and a receiver site 150 including a decoder according to the present invention for transmitting low data rate, medium data rate (audio) and high data rate (video) data implemented in a satellite communications system.

Referring now to FIG. 1, there is shown a transmitter site 100 including an encoder (and service multiplexer) and a receiver site 150 including a decoder (and demultiplexer) according to the present invention applied in the environment of a satellite communications system. Audio/video compressor circuits 101(1) to 101(m) are shown for individually receiving audio service data and/or video service data, for example, from a plurality of programmers providing such services. One such MPEG video compressor known in the art is a National Transcommunications, Ltd. (England) NTL 2000 video compressor. Similarly, a plurality of low data rate, for example, RS232 digital data services are received at low speed data formatters 105(1) ... 105(n). The audio/video compressors compress the received medium and high data rate data in accordance with known algorithms (for example, in accordance with currently known or proposed standards such as MPEG I or II, audio or video). The data formatters strip parity, start, and stop bits and other non-information payload data from the incoming formatted data and reformat the data into PACKETS data including a 3 byte header as will be further described herein in connection with a discussion of FIG. 6c.

Control computer 120 controls multiplexer 110 to time division multiplex the compressed medium and high data rate streams output from compressors 101(1) ... 101(m) and the low data rate streams output from formatters 105(1) to (n) into a serial data stream for output to modulator 130. The high speed data link connecting multiplexer 110 and modulator 130 may be coaxial cable, optical fiber or twisted pair, so long as the transmission is error free and at sufficient data rate. Modulator 130 then modulates the digital data stream on to a carrier and upconverts the carrier as necessary for transmission via, for example, C, Ku or L band frequencies through a satellite antenna 140. Modulator 130 may preferably comprise a quadrature phase shift key modulator known in the art for satellite transmission. Satellite antenna 140 beams a signal including the modulated data to satellite 160 which may be functionally referred to as a transponder. Transponder 160 simply repeats the received signal toward earth and satellite receiver antenna 151.

Receiver site 150 typically includes a tuner/demodulator 154 for selecting one of a plurality of channels to which satellite tuner/demodulator 154 may be tuned. Tuner/demodulator 154 downconverts and outputs a demodulated data stream to clock and data recovery circuit 155. Clock and data recovery circuit 155 in turn outputs an error corrected data stream and synchronization data to demultiplexer 156. Demultiplexer 156, under control of display control processor 158, outputs demultiplexed data streams to various output ports to subscriber equipment 159 via data processors 157. The data processors may, for example, include an MPEG decompressor as will be further described herein in connection with FIG. 6a.

A user may select one or more virtual or other channels by inputting, for example, channel numbers via a selector (KBD) 152 according to any known means, e.g. remote control or front panel. The selection information is sent to display control processor (DCP) 158, which controls all aspects of the decoder's operation. A digital compression in-board security element (DISE) 153 is utilized for decrypting encrypted PACKETS or other data requiring decryption. Further details on DISE 153, may be found in U.S. Pat. No. 5,029,207, U.S. Pat. No. 5,237,610 and application Ser. No. 08/101,944, entitled "Method and Apparatus for Uniquely Encrypting a Plurality of Services at a Transmission Site" filed Aug. 4, 1993 in the names of Gammie et al. and applications related to the present application, all incorporated herein by reference as to any subject matter deemed essential to the present invention.

The subscriber equipment 159 may comprise, for example, standard or high definition television reception equipment, digital audio reception equipment, digital data processors or computers, video game equipment, facsimile receiver/printers, energy management equipment and the like.

The receiver site 150 may not only be a subscriber to services but may be a provider of services such as a cable television system operator. In such a scenario, the receiver site 150 may not include typical subscriber equipment 159 but may include cable television system headend equipment known in the art including television modulators and digital audio service providing equipment and the like.

Figure 2A:
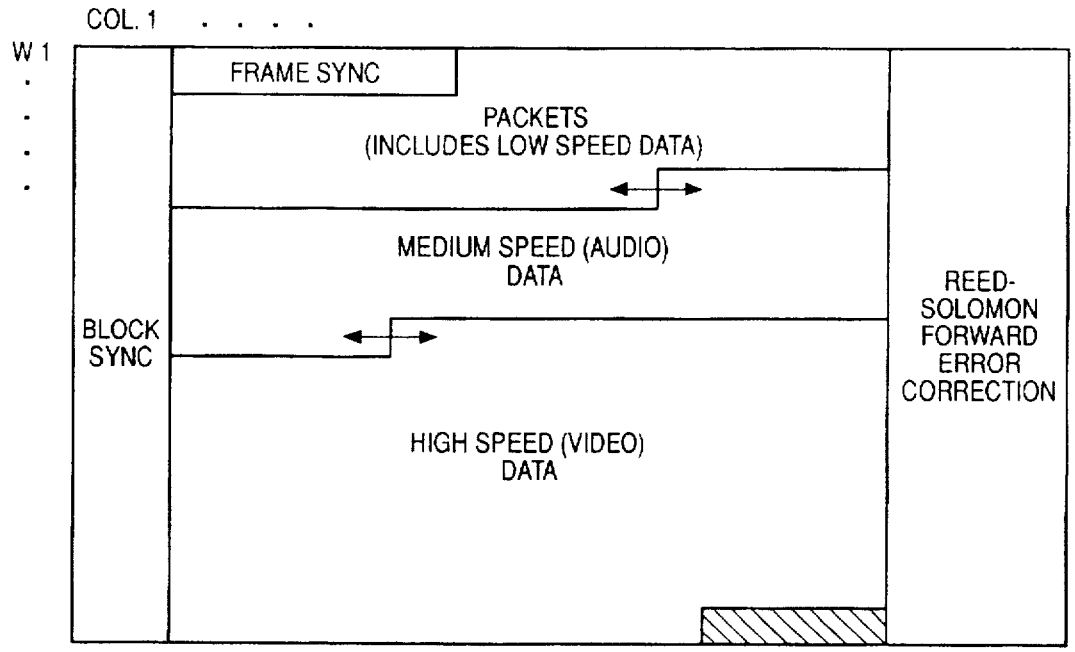
FIG. 2a is a diagram showing a scalable multiplex frame, including synchronization words BLOCK SYNC and FRAME SYNC, for transmitting a digital data stream of low data rate (included within PACKETS), medium data rate (audio) and high data rate (video) data protected by Reed-Solomon encoding according to the present invention.

Referring now to FIG. 2a, there is shown a generic frame according to the present invention having highly flexible characteristics. The frame according to the present invention is rectangularly arranged in rows and columns. The static or fixed elements of the depicted scalable multiplex frame according to the present invention are BLOCK SYNC (for example, one or two bytes of each horizontal row) and FRAME SYNC (which comprises part of the first row of the depicted frame). All other depicted elements of the frame are flexible and may change from medium to medium and from frame to frame. For example, Reed-Solomon error correction parity data may be provided for satellite transmission and omitted for less error prone forms of media. PACKETS data comprises control information and low speed data services, as will be described in further detail herein.

Moreover, the delineation between what is shown as PACKETS data and areas for medium speed (audio) and high speed (video) data portions are flexible, and the figure is not intended to show that the boundaries between such forms of data is fixed at any one point in the frame. A predetermined structure is provided to the frame in that FRAME SYNC follows the first byte of BLOCK SYNC in a frame according to the present invention. PACKETS data follows FRAME SYNCH, followed in turn by medium speed (audio) and high speed (video) data in that order. There will always be some PACKETS data for control purposes but, depending on the data services to be transmitted, there may not exist low speed data portions thereof, medium speed data sections or high speed data sections of a particular frame.

The depicted frame is intended to show that each particular frame comprises a fixed number of bits in a horizontal direction which may for convenience be defined as a predetermined number of bits of data. A practical maximum number of bytes (of eight bits each) in a horizontal direction is 256 including BLOCK SYNC, limited primarily by the 255 byte capacity of Reed-Solomon decoding integrated circuits available in the market. This horizontal dimension measured in bits (256 bytes×8=2048 bits), sometimes referred to herein in terms of columns of bytes, may vary depending on the application. However, for a given transmission segment (for example, a satellite segment portion of a system including coaxial cable or optical fiber segments as well), the frame structure in horizontal and vertical dimensions will remain constant; (see FIG. 2c). Moreover, according to FIG. 2c, transmissions comprise a sequence of frames transmitted at a frame rate Fr frames per second.

In a vertical dimension, a single frame may be defined as comprising a predetermined number of lines or rows of data, hereinafter referred to generally as blocks. Yet, the number of bytes in a block and the number of blocks vertically in a particular frame may vary.

Regarding the first line or block, then, of the depicted frame, there is shown a first BLOCK SYNC word or block synch which is preferably one byte (8 bits) long. Of the 8 block sync bits, four to eight bits are set to a fixed pattern to achieve a robust synchronization system. The term "robust" is intended, for example, to characterize the present system as one in which, at a receiver, and, even in a particularly data error-prone media, horizontal and vertical synchronization can be recovered, as necessary, on a frame to frame basis.

Thus, synchronization is assisted through the addition of the short, relative to FRAME SYNC, BLOCK SYNC word which appears as the first byte position of each row before information data bytes in the lines of a frame. The block synch word is repetitive at the same columnar location throughout a particular frame and is thus easily recognized and detected.

In an alternative embodiment, typically for utilization in a less error-prone media, some of the block synch bits at particular, predetermined locations in the word may be utilized for network signalling or other purposes, for example, in telecommunications or transmitter (source) identification applications. Examples of such network signalling data include so-called automatic transmitter identification signalling and order wire, maintenance, alarm or other data utilized in digital telecommunications. The number, then, and position of bits allocated to network signalling must be fixed for any given segment of a network, as this a-priori information must be programmed into the receiving device but may vary from segment to segment.

It is not recommended that the number of bits reserved for a synch pattern be reduced to less than four, except in networks or media which are virtually free of errors. Thus BLOCK SYNC should comprise a minimum of four bits, preferably comprises an eight bit byte, and may comprise two bytes, depending on the application.

Locating the network signalling bits at particular positions in a block synch word makes these bits accessible even in a particularly error-prone environment where, for example, error protection techniques such as Reed-Solomon, Viterbi coding and interleaving are utilized or before frame synchronization is obtained or even required. Since such network signalling or other data bits, however, may not be protected by block data forward error correction parity bytes, a simple running majority vote error corrector may be utilized, thus determining the network signalling on other data values. At a receiver site 150, the data may be accumulated as a low speed data channel and/or stored in memory and, as already suggested, a majority vote error corrector utilized.

Referring now to FIGS. 2d(1) and 2d(2), alternative embodiments of one byte horizontal synchronization (BLOCK SYNC) words according to the present invention will be described by way of example. Referring first to FIG. 2(d) 1, an eight bit horizontal synchronization word of eight bits is shown comprising alternating zero and one values 01010101. Such a horizontal synchronization word exhibits a particular frequency for a brief period of time and has an advantage of being easily detected in a noisy environment.

All eight bits in this example are utilized for synchronization and no bits remain as network signalling or other data capacity. The synchronization bits may just as easily comprise the pattern of 10101010 (not shown). If either word 10101010 or 01010101 is deemed acceptable to a receiver by convention, then, a binary code may be utilized to transmit very low speed data over time via the BLOCK SYNC words. The horizontal synchronization word of FIG. 2(d)(1) may be locked to by conventional locking techniques, either frequency (phase) or pattern recognition.

Referring, however, to FIG. 2(d)(2), the fixed synchronization pattern only comprises the first four bit positions and four bit positions 4–7 remain as variable data bits XXXX for, for example, network signalling or other low speed data transmission purposes; For example, network signaling data may be indicated by storing in a receiver the fact that the latter four predetermined bit positions 4–7 are utilized for network signaling data. By way of example, predetermined network signaling data 0111 may be transmitted as variable data XXXX. A table of memory of a receiver 150 may be composed for identification of received network signalling source/destination or other data and recognized by the receiver, as the last four bit positions (shown). Upon receipt, for example, the network signaling data may be compared with the stored table data and recognized as to network signalling source/destination. Instead of evalutions other data of a particular BLOCK SYNCH word, the four variable data bits may be accumulated as a low speed data channel over time.

Moreover, referring to FIG. 2d(2), an eight bit horizontal synch word is shown where the synchronization pattern portion comprises alternating ones and zeros 1010 at opposite bit positions from FIG. 2d(1) for the first bit positions 0–3. Also, the first four bit position could just as easily comprise the synchronization pattern 0101, either pattern still representing the same frequency. Block or line synch may be detected by frequency (phase) detection or by pattern detection.

Each arrangement described or derived from FIGS. 2(d) (1) or (2) or combinations or variations thereof may have advantage in different media segments of a lengthy transmission chain, for example, involving optical fiber, satellite, coaxial cable, twisted pair and the like and their susceptibility to data errors.

Referring again to FIG. 2a, the FRAME SYNC word preferably comprises a fixed duration, for example, on the order of 64 bytes of pseudo-random data. The 64 byte word can be known to transmitter 100 and receiver 150 alike and determined from a given polynomial such as:

$$X^{}8+X^{}6+X^{**}5+X+1.$$

Further details on BLOCK SYNC and FRAME SYNC determination and recovery at a receiver may be found in copending, U.S. application Ser. No. 160,841, entitled "Memory Efficient Method and Apparatus for Synch Detection," and Ser. No. 160,839, entitled "Method and Apparatus for Locating and Tracking a QPSK Carrier" filed concurrently herewith and incorporated herein by reference.

Referring again to FIG. 2a, PACKETS is intended to refer to a collection of, for example, control data, system data and low speed data service packets in blocks (rows). The control and system data are intended to signal or control a receiver 150 to, for example, identify the data types or data services and the respective data beginning and ending boundaries to follow as well as provide a basis upon which an end user may control his receiver to receive and output data services as he chooses. In other words, the user's selection of services is only limited by their on-hand equipment and their preferences to particular ones of the services in particular arrangements of the various multiplexed data streams or blocks that follow in the data stream (low, medium, high speed data).

By low speed data is intended teletext, facsimile, conditional access, alarm, energy management, certain audio and other data streams which typically exhibit data rates of less than sixty-four kilobytes per second. By medium speed data is intended high quality coded audio such as "surround-sound" and medium speed data rates between, for example, 64 kilobytes per second and T1 carrier (telecommunications) rates of approximately one megabit or more per second. Medium speed audio data is preferably compressed in accordance with well-known audio compression algorithms known in the art. Then, by high speed data, is intended some compressed or non-compressed forms of video transmission up to data rates required for high definition color television (HDTV). By HDTV is intended Japanese MUSE, European, so-called Grand Alliance proposed U.S. format or other HDTV format. Such a frame structure is not intended to be fixed; for example, the present suggested data rates may be broken into only two regions of low and high speed data. Nevertheless, for example, low speed data will always be included within PACKETS data and precede higher speed data sections of the frame, and high speed data will always follow slower speed data and precede the FRAME SYNC word for the next frame.

The size of a particular frame is dictated by the transmission medium and the data to be carried. One of the features of the present invention is a minimization of the number of bytes utilized for synchronization or error correction data portions of the fram payload or information data portions of the frame. Thus, transmitter power and signal to noise performance objectives are achieved along with information payload maximization. Then, large frames are inherently more efficient, and there is an improved tolerance of long burst errors, for example, in a cable environment.

Other factors weigh against the choice of a large frame. These include the speed of achieving synchronization at a receiver and the cost of error correction circuitry such as de-interleaving memory costs at a receiver site.

In an error-prone environment, error protection is provided by a Reed-Solomon block code denoted REED-SOLOMON and appearing in FIG. 2a as a narrow but long rectangular column at the right of the figure. In the horizontal or block width dimension, the practical maximum is on the order of 255 bytes of information and error protection and, to achieve T=10 (correction for ten errors) within that 255 bytes, there will be 20 bytes of the 255 bytes reserved for Reed-Solomon parity. The 255 byte barrier is primarily set by standard Reed-Solomon block decoding integrated circuits known in the art; however, the 255 byte barrier may be breached with time. Of course, if the transmission media is practically data error-free, then, Reed-Solomon parity data can be practically eliminated. For some cable systems exhibiting a medium error rate, a T=5 Reed-Solomon data protection scheme may be more appropriate.

Figure 2B:
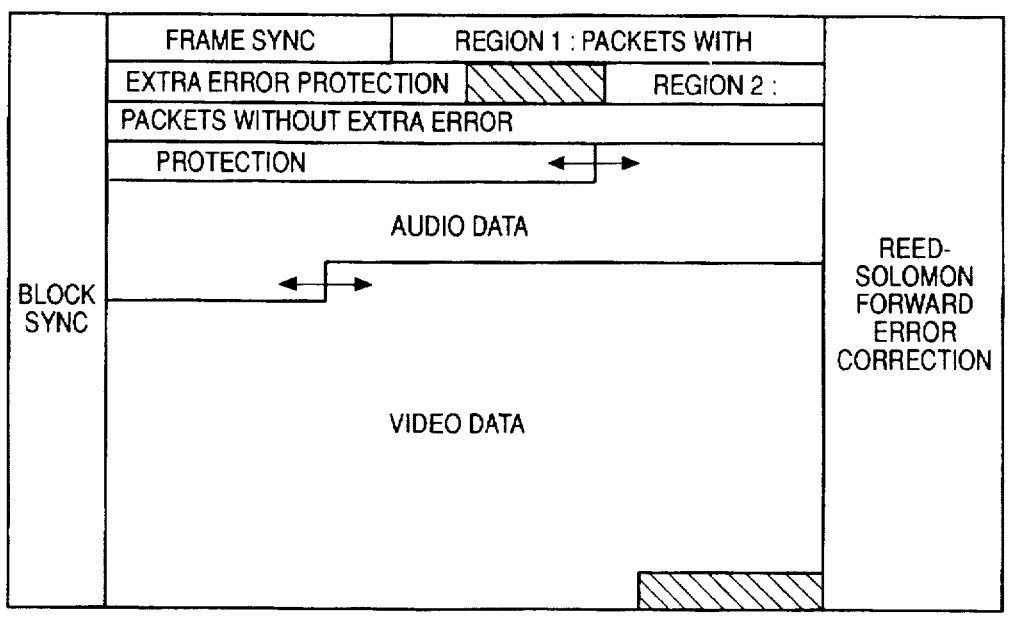
FIG. 2b is a second diagram of the frame of FIG. 2a wherein the PACKETS area is further broken down into first and second regions, the first region including packets with extra error protection and the second region including data protected only by Reed-Solomon encoding.

As is shown in either FIG. 2a or 2b, the Reed-Solomon block code is appended to the information data bytes as forward error correction (FEC) parity bytes. The proportion of FEC bytes to information bytes is on the order of from one to ten per cent depending on the particular medium or mixture of media or application (one per cent meaning only two of 255 bytes for Reed Solomon parity). The size of each block of data then, information data bytes plus FEC bytes, is now preferably less than 255 set, as previously suggested, by the availability of commodity electronic integrated circuits.

To provide additional protection against extended bursts of errors, a number of blocks are grouped in the depicted frame, and bytes are shuffled between blocks according to a predetermined algorithm known to transmitter and receiver alike. This process is most conveniently described as interleaving. The number of blocks over which interleaving is performed (or "depth" of interleaving) is chosen again for the medium and the expected burst error lengths.

Interleaving is applied at a transmitter site 100 and de-interleaving at a receiver site 150 because a byte correcting limit of 16 errored data bytes of 255 data information bytes is a practical upper limit for Reed-Solomon while interleaving, or swapping rows and columns of a frame for transmission, is a strategy that can improve data recovery in a burst error-prone environment. To recover data and correct errors therein, a receiver must first identify the boundaries of the interleaved frame, reverse the byte shuffling and then apply the Reed-Solomon correction algorithm. As already indicated, this frame boundary of the interleaved frame is identified by the specific bit pattern of the FRAME SYNC word embedded in the transmitted multiplexed data stream. Typically, the interleaved frames are received in a sequence of constant sized frames, and so the FRAME SYNC word is repeated on a periodic or frame basis. The regular detection of the FRAME SYNC bit pattern is the basis of reliable frame boundary determination, even in the presence of many data errors.

Figure 6A:
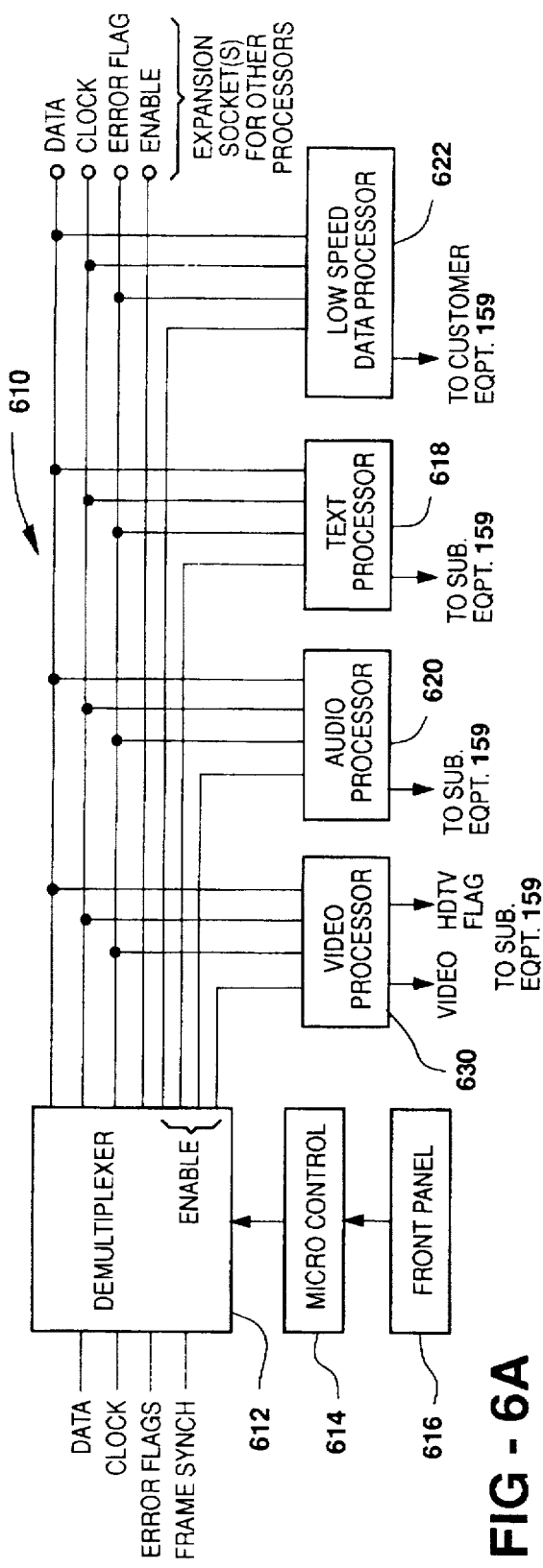
FIG. 6a is a detailed block diagram of a preferred demultiplexer arrangement, the demultiplexer being responsive to synch and clock recovery accomplished via FIG. 5 and outputting data, clock and error flags on a bus 610 to data processors for low speed, medium speed and high speed data streams.

The boundary of the interleaved frame is also used to mark the start of the scalable frame-based multiplex which is carried as the data information payload. Referring briefly to FIG. 5 and 6a, in the receiver, this periodic frame-indicating signal is fed forward from the error corrector stage (FIG. 5) to a demultiplexor stage (FIG. 6) in parallel with the corrected data and any indication of FEC failure (error flag) due to excessive errors.

According to the present invention, it is recommended that the high speed (video) data sampling rate conform to the CCIR standard 601 sampling rate at 13.5 megahertz. This clock rate may be easily generated if the multiplex rate of the present invention is chosen to comprise multiples of 2.25 megabits per second. The 13.5 MHz clock rate is particularly useful since it has common elements in both the European 625 and North American and Japanese 525 line worlds.

Referring to FIG. 2c, the frames of either FIG. 2a and 2b are transmitted as a sequence of frames at a rate and having a width (columns) and length (rows) which are limited to the bandwidth of the transmission channel. According to the present invention and for satellite transmission in particular, it is suggested to utilize a data frame rate on the order of 50 Hertz. Other frame rates besides 50 Hz are possible and within the scope of the present invention.

A nearly square, but not perfectly square, frame is preferred and thus the practical maximum limit on the vertical dimension is about 512 rows or blocks.

The scalable frame-based multiplex is configured to allocate data capacity to various data inputs. Normally, this is a static allocation of frame capacity, but, as data service priorities are reestablished at a control location or transmitter site, the multiplexer of the present invention interrogates input buffers of the individual input data services to determine the required data allocation automatically, even on a frame-by-frame basis as required. Given new service requirements or priorities, the multiplexer preempts data capacity from lower priority data services as a higher priority service requires an increased allocation of frame capacity.

As reallocation of frame capacity may result in an unacceptable interruption of a particular low priority service, an alternative mode of operation is to establish an upper bound to the data rate for each service, so that all data services can be guaranteed carriage under all circumstances. The multiplexer then reduces the frame capacity allocated to each service should the maximum capacity not be required. Thus, the need to byte stuff null data into a service stream simply to conform to a predetermined frame capacity is minimized as is any requirement on a receiving data processor to determine valid from invalid or byte-stuffed null data.

PACKETS data will now be described which follows the FRAME SYNC word in the frame. Certain PACKETS data is utilized to identify the number of bytes provided in a frame for a particular service when byte stuffing is required. Six bit packet headers uniquely differentiate the type of descriptive information to follow in a predetermined packet length. For example, two types of packets may be Video Service Descriptor packets and Audio Service Descriptor packets. Referring briefly to FIG. 12b, the packet header for the video descriptor will be 100101 and, referring to FIG. 11b, for audio 100011, by way of example. Other headers will differentiate other packets up to a maximum of sixty-four different types of PACKETS.

As indicated before, a reasonable maximum number of video services is 32, so the header is followed with a video service identifier comprising five bits; see FIG. 12b, the video service stream number. Since a practical limit on audio services is sixty-four, following the header will be an audio service identifier of six bits; see FIG. 11b, audio service stream number. In the video packet, one way to identify high definition is to utilize an HDTV flag bit; see FIG. 12b, HDTV video output. If the flag is set for a particular video service, then a control signal may be preferably transmitted via a connector to appropriate decoder equipment to switch an HDTV receiver display from standard to high resolution processing modes or vice versa; see FIG. 6a, HDTV flag output of video processor 630.

The service byte count word preferably follows the header and video service identifier and HDTV flag. The service byte count word determines the number of bytes for a particular identified service, for example, 17 bits (2**17 bytes maximum); see FIGS. 11b and 12b. One service byte count packet is sent for each identified data service (audio or video or other service) whenever null data or byte stuffing is required. A demultiplexer at a receiver site 150 initializes a counter at the beginning of each frame for each identified service. The byte counter matches the byte count for the service against the 17 bit service byte count word. If the service byte count is reached before the end of a frame, the data service output is suspended and the balance of the data in that service in that frame is presumed to be byte-stuffed null data. (See FIG. 2a, hatched area in last row of the frame).

No service byte count packet may be sent for a particular identified service. In that case, it is assumed that the full predetermined frame capacity is allocated to that service with no null bytes.

Immediately following the FRAME SYNC word is a "MUX Structure Control" packet; see FIG. 8. In a satellite environment, the importance of this packet is reflected in providing extra forward error correction and in its position, always following FRAME SYNCH. One suggested means of providing extra forward error correction for this packet is to utilize a 5:1 majority logic, (3,2,13) convolutional code.

The MUX (mutliplex) structure control packet comprises some 100 to 200 bits of information; (according to FIG. 8, it preferably comprises 144 bits). For example, one included word may be a structure control type word for permitting a static definition of the frame structure; for example, when only one static collection of data services is contemplated, then the structure control type will in shorthand define a particular predetermined static structure. For example, for telecommunications applications, it may be contemplated that the overall frame structure will remain static and predetermined.

The structure control packet (MSC) also defines the variable cryptocycle or session length (in frames) and the crypto-cycle count, for example, from one to 64 (or even 256) maximum via an eight bit byte (see FIG. 10), which may be dynamically redefined. There is also an end of PACKETS marker, an end of medium (AUDIO) speed data marker and so on which can initiate counters to signal the end of the portions of the packet type to a decoder. There also are preferably included other counter data such as the number of bytes per data service, such as medium speed data service and high speed data service. There is also a signal as to when the end of extra forward error correction PACKETS data is reached (region 1 in FIG. 2b). In FIG. 10, region 1 is defined as all packets indicated above the double line boundary of the table. Region 2 is all packets indicated below the double line boundary.

Referring to FIG. 2b, the PACKETS data portion of the multiplex frame, then, may be further defined to consist of two regions: one region including the Mux Structure Control packet requiring additional forward error correction and a second region requiring no additional forward error correction than the Reed-Solomon coding provided for each row or block (excluding BLOCK SYNC and FRAME SYNC). Examples of PACKETS in region 1 are the multiplex structure control packet (FIG. 10), audio and video control packets (FIGS. 11a and 12a) and seed packets for decryption.

Other categories of PACKETS data do not, then, require additional forward error correction. These include any 32 and 42 byte packets described further herein. Thus, region 2 includes cyclic system data, composite virtual channel and definition packets for providing what may be perceived as additional data services, addressed data packets for transmitting messages to addressed decoders, text and low speed data packets and other service packets (OSP). Teletext services and virtual channels are further described in related applications Ser. Nos. 160,827 and 160,848 to the present application and are not further described herein.

Figure 3:
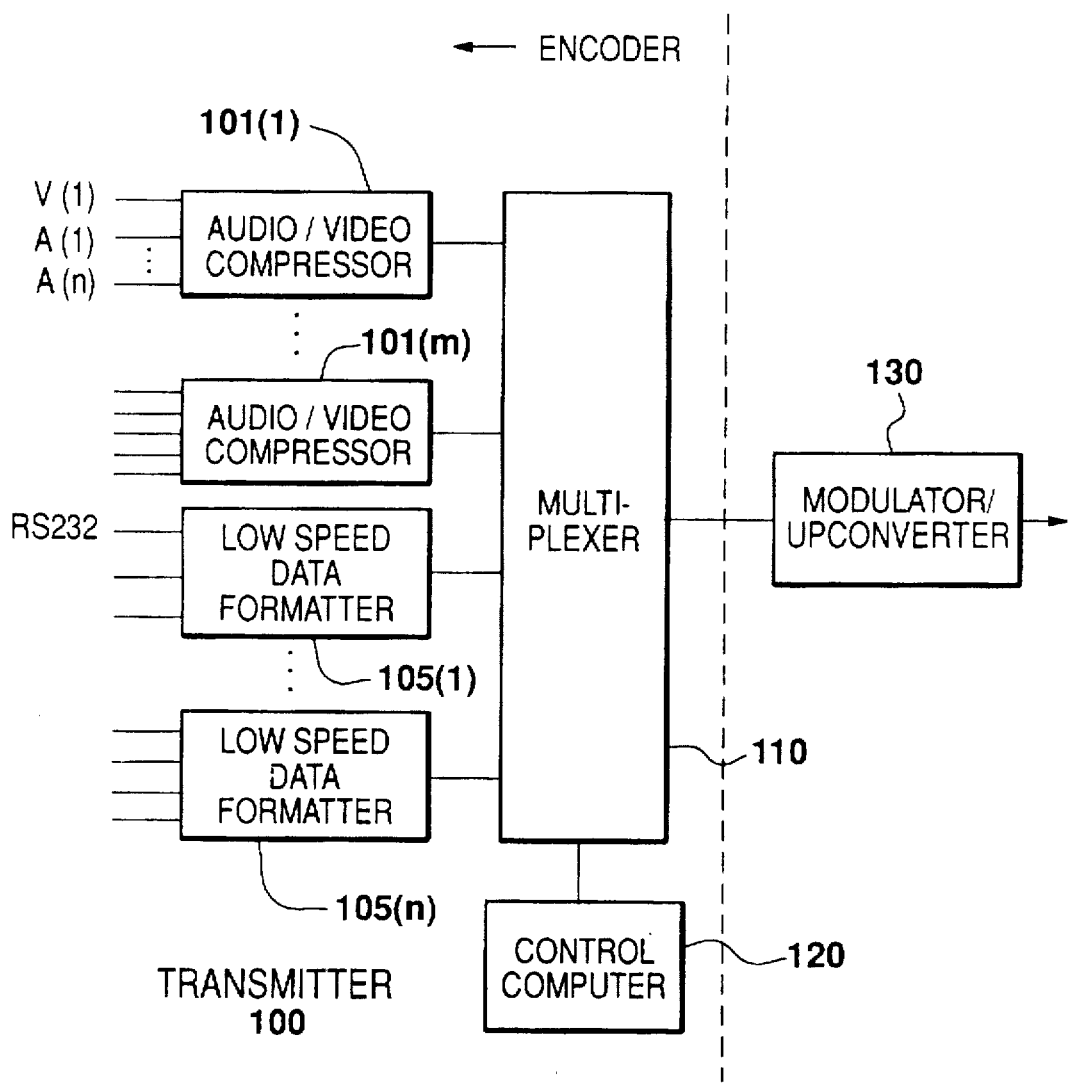
FIG. 3 is an encoder block diagram for one preferred embodiment of a portion of transmitter 100 of FIG. 1 showing the connection of audio and video compressors and low speed data formatters to a multiplexer under control of a control computer for modulation by a modulator on to a carrier for transmission, for example, by satellite as shown in FIG. 1.

Now, an encoder according to the present invention will be further described with reference to FIG. 3. It has already been described that an encoder according to the present invention typically involves A/V compressors 101(1) to 101(m). Particular suggested capacities for one such A/V compressor, for example, compressor 101(1) are to limit the number of input video streams to 1 and to provide up to a maximum of four audio input streams (or two stereo streams) each comprising left and right input streams.

Figure 4:
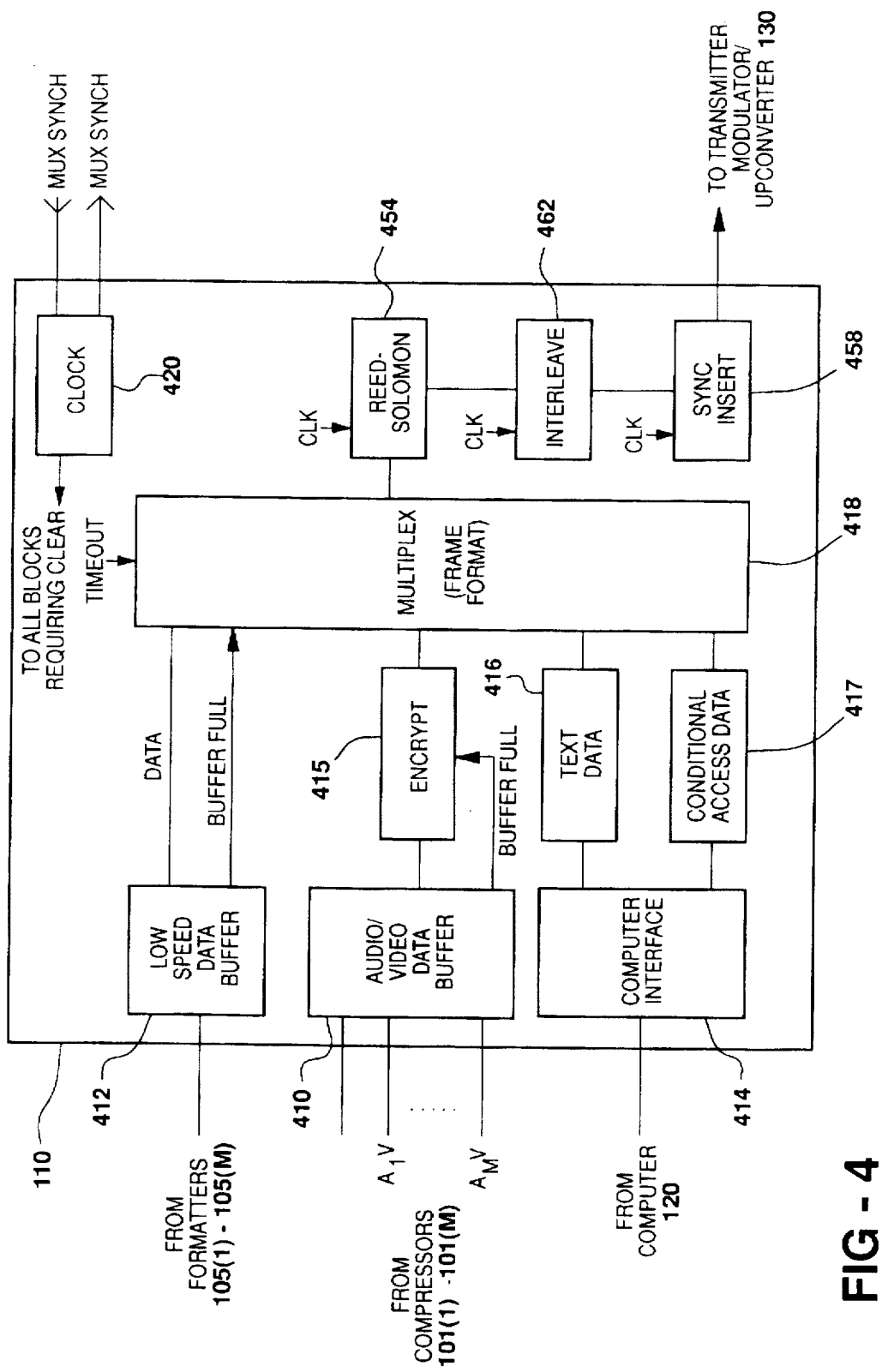
FIG. 4 is a detailed schematic block diagram of a multiplexer 110 of FIGS. 1 or 3 according to the present invention for outputting multiplexed data according to the multiplex frame format of FIGS. 2a, 2b and 2c.

It has also been described that low speed data formatters 105(1) to 105(n) be provided. Typically, however, each low speed data formatter may handle, for example, sixteen or even thirty-two input data streams. Consequently, it is contemplated that the number of such formatters required will number only 1 or 2. Low speed data formatters typically receive low speed data in a predetermined format, such as RS232, and strip the data of any header data, start data, stop data, parity data and such depending on the predetermined and identified input data stream so that only true information carrying data remains in a serial data stream. The data is then reformatted into packets as per FIG. 6c for passage to buffer 412 (FIG. 4).

Now, the multiplexer 110 of FIG. 3 will be described in further detail with reference to FIG. 4. Audio/video service streams A1 to An are received from audio/video compressors at audio/video data buffer 410. Service multiplexer 110 operates to multiplex a plurality of digital service streams for transmission to remote locations. Also shown are inputs to a low speed data buffer 412 from low speed data formatters 105(1) to 105(n). Buffer 410 (audio/video) and buffer 412 for low speed data preferably signal a buffer fullness condition to the next functional element, for example, encryption block 415, if encryption is desired, or on to multiplex frame formatter 418 for low speed data. Encryption block 415 is intended to represent the inclusion of, for example, single or double tiers of encryption in accordance with seeds and keys and particular, predetermined algorithms as required for the digital service streams, for example, in a pay environment.

Other digital data is input from a text/graphics input computer, for example, teletext data to text data processor 416 via computer interface 414 to the service multiplexer 418. Conditional access data is input, for example, from a billing computer or subscriber service computer for storage in conditional access data buffer 417. Conditional access data typically defines the services, especially pay services, to which a subscriber has subscribed. This data interfaces also via interface 414 and is processed and packeted into region 2 PACKETS via conditional access data processing block 417 for input to multiplex formatter 418.

Thus, at the output of multiplex (MUX) block 418 is a multiplexed frame structure as described by FIGS. 2a, 2b and 2c. The output digital stream is Reed Solomon encoded according to an appropriate encoding scheme depending on the noise characteristics of the transmission media by a well known Reed Solomon encoder 454. Then, preferably in a highly noisy environment, the frame is interleaved on a byte or word (rows and columns switching) basis at interleave block 462. Interleave circuit 462 interleaves the data frame by transposing row and column addresses of data within the frame. Lastly, BLOCK SYNC and FRAME SYNC are inserted into the frame just prior to transmission at synch insert block 458. This data then appears at a receiver at its original location in the frame while all other data is interleaved. Clock 420 provides clocks to any and all blocks requiring same including, but not limited to Reel Solomon 454, Multiplex 418, interleave 462 and sync insert 458. MUXSYNCH signals will be described in connection with FIGS. 7, 8 and 9.

Referring now to FIG. 5, there is shown a receiver 150 per FIG. 1 in greater detail. Receiver 150 includes a tuner 579 and a demodulator 580 already shown comprising tuner/demodulator 154 of FIG. 1. Such components do not always comprise elements of a decoder. The tuner, for example, may preferably be a stand-alone device as may the demodulator 580. In an alternative embodiment the tuner and demodulator together may comprise a stand-alone device. In yet a third alternative embodiment, the demodulator may comprise an element of the decoder as shown in FIG. 5.

According to FIG. 5, microcontroller 581 (FIG. 1, DCP 158) controls tuner 579, demodulator 580, Viterbi circuit 582, clock and data recovery (CDR) circuit 584 and Reed Solomon decoder circuit 588 and together comprise a decoder according to the present invention. Further details of the operation of tuner 579, demodulator 580, Viterbi circuit 582 and CDR circuit 584 for locking to incoming signals are found in co-pending, concurrently filed application Ser. No. 08/160,839, entitled "Method and Apparatus for Locating and Tracking a QPSK Carrier" incorporated as to essential subject matter herein. Microcontroller 581 (FIG. 1, DCP 158) also controls demultiplexer 612 of FIG. 6a as will be subsequently described in greater detail. Demodulator 580 comprises a standard QPSK demodulator and Viterbi circuit 582 standard Viterbi error protection filtering known in the art. On the other hand, clock and data recovery ASIC 584 may preferably comprise a custom integrated circuit for operating in accordance with U.S. application Ser. No. 160,841, entitled "Memory Efficient Method and Apparatus for Synch Detection", specifically incorporated herein by reference. According to that application, one memory 586 is shared for synch recovery and for deinterleaving functions. First, synchronization for horizontal or block synchronization is recovered; then, the frame synchronization is recovered. The occurrence of frame synchronization then signals the release of the memory for deinterleaving purposes. Memory 586 may be a conventional or standard dynamic random access memory (64k×16, for example, or larger) or a pseudo-static random access memory known in the art, for example, a Toshiba TC5183 pseudo-static RAM. Memory 586 may be integrated within the CDR ASIC 584.

A data stream received from the satellite or cable system is tuned to by tuner 579 and then demodulated by demodulator 580, preferably a QPSK demodulator known in the art. The demodulated data stream is passed to Viterbi circuit 582 for error correction. The partially corrected signal is passed to clock and data recovery circuit 584 which communicates with deinterleaving memory, for example, dynamic random access memory (DRAM) 586. The output of clock and data recovery circuit 584 is (1) digital service data which is passed to Reed Solomon circuit 588 for decoding, (2) clocks and (3) a frame sync pulse. The clock and data recovery circuit first recovers horizontal or block synch from the BLOCK SYNC word, then vertical or frame synch from FRAME SYNC, and then can output the digital multiplexed service stream data with assurance for RS decoding at functional block 588 which may be a standard RS decoder integrated circuit known in the art. Recognition of network signalling or other data included in BLOCK SYNC may occur at CDR 584 in combination with microcontroller 581.

Referring now to FIG. 6a, the outputs of the clock and data recovery circuit (clocks, frame sync, RS data from Reed Solomon circuit 588 and an error flag depending on errors) are preferably passed to demultiplexer 612 (demultiplexer 156 of FIG. 1 shown in greater detail). Demultiplexer 612 is controlled preferably by the same microcontroller as microcontroller 581 of FIG. 5 which may be a decoder control processor for controlling the entire set of operations of a decoder according to the present invention. In an alternative embodiment, microcontroller 614 may be separate from microcontroller 581 and operate in sequence with that microcontroller, for example, over a common bus (not shown). Front panel 616 is intended to indicate the same or similar function to KBD 152 of FIG. 1. Microcontroller 581/614 may operate in concert under control of a remote control or other user keyboard for tuning and control purposes as appropriate (referred to generically as front panel 616). Microcontroller 581/614 preferably comprises an appropriately selected and programmed microprocessor, such as a Motorola MCM68HC11, including on board or external read only and/or random access memory as required for the particular application.

The demultiplexed data streams comprise, for example, video, audio, text and low speed data streams which may be gated into respective data processors 630, 620, 618, and 622 responsive to multiplex structure control data words as interpreted by demultiplexer 612. Other processors (not shown) may be also provided on the bus and be provided individual enable leads which operate to gate the service data streams into the appropriate service stream processor. A fifth type of peripheral processor that is not shown is an optional service processor for processing optional service data (of optional service packets) other than data types which may be processed by the data processors 618, 620, 622 and 630. An expansion socket is provided for expanding the data processing capabilities to other processors not shown. Such an advantageous arrangement is further described in U.S. application Ser. No. 161,159, entitled "A Method Service Data Receiver Architecture, in which the data streams may immediately flow through to the peripheral processors, for example, processors 618, 620, 622 and 630 without any requirement for buffer memory. The MSC control word (FIG. 10) provides counter data as previously described which, under control of microcontroller 614, is utilized to actuate ENABLE signals of data bus 610 as appropriate. The counters may be contained within the MUX application specific integrated circuit 612 or microcontroller 614. In one implementation, the low speed data processor 622 and the text processor, shown separately, may be integrated with demultiplexer ASIC 612.

Referring now to FIGS. 6b and 6c, the recovery of low speed data from PACKETS (FIG. 2a or 2b) is further described. FIG. 6b provides particular detail of low speed data processor 622. Low speed data from data bus 610 is enabled via an enable lead to enter header stripper functional block 624. The data payload then is forwarded to buffer 626. Reformatter 628, under control of system clock and user input as to the type of data, outputs one or more low speed data streams with reincluded parity, start, stop bits and so on as required.

The transmitted data packet is shown in FIG. 6c and preferably comprises a three byte header (24 bits). The bits are allocated as to packet type (four bits) which, for example, signal RS232 data, four bits for 1 of 16 service numbers, six bits for byte count, two bits for rate trim, three bits for selecting baud rate and the rest spare. The data payload of serial data may, for example, comprise 312 bits (39 bytes), the depicted packet then comprising a total of 42 bytes.

Rate trim of, for example, 2-3 bits is for fine tuning a divided down system clock to closely meet the expected data rate, for example, 2400, 4800, 9600 and so on due to any difference that might exist between, for example, a divided down 27 MHz clock and the desired baud rate. A rate trim of 00 may represent a 0% scaling, 01 0.5%, 10 1% and 11 2%. Baud rate may be encoded, for example, such that 000 represents 300 baud, 001 600 baud, 101 1200 baud, ... 100 4800 baud and so on up to 111 representing a 38.4 kb (or 64 kbps) rate.

At times, the desired output data rate may exceed the input data rate. In such a situation and in accordance with the present invention, the data may be output at a higher rate than received, for example, in a sequence of bursts with RS232 formatting determined by the configuration of the receiver.

Figure 7A:
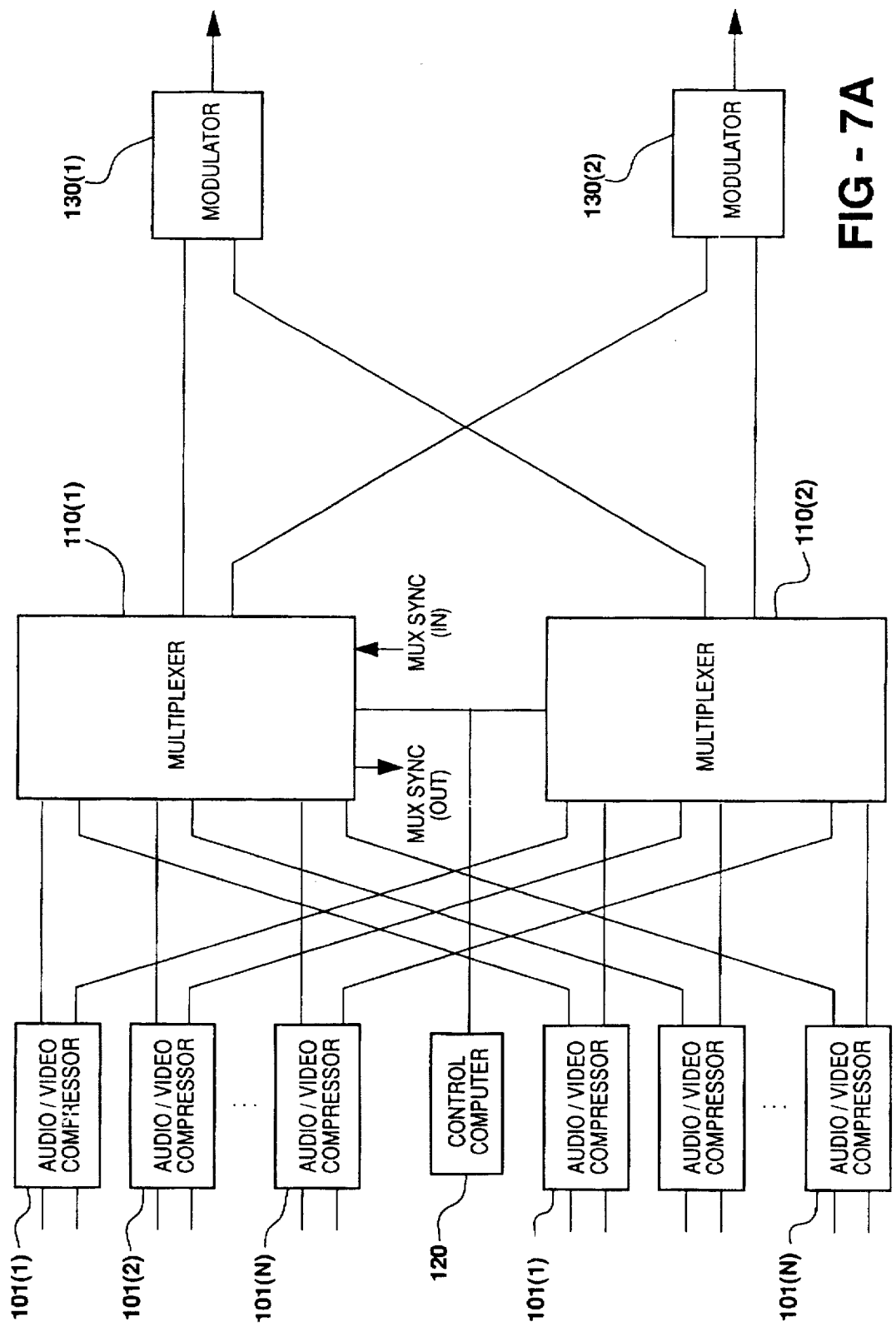
FIG. 7a shows a redundant configuration wherein the multiplexer functions are duplicated such that if a particular multiplexer fails for one reason or another, control may be transferred to the redundant multiplexer.
Figure 7B:
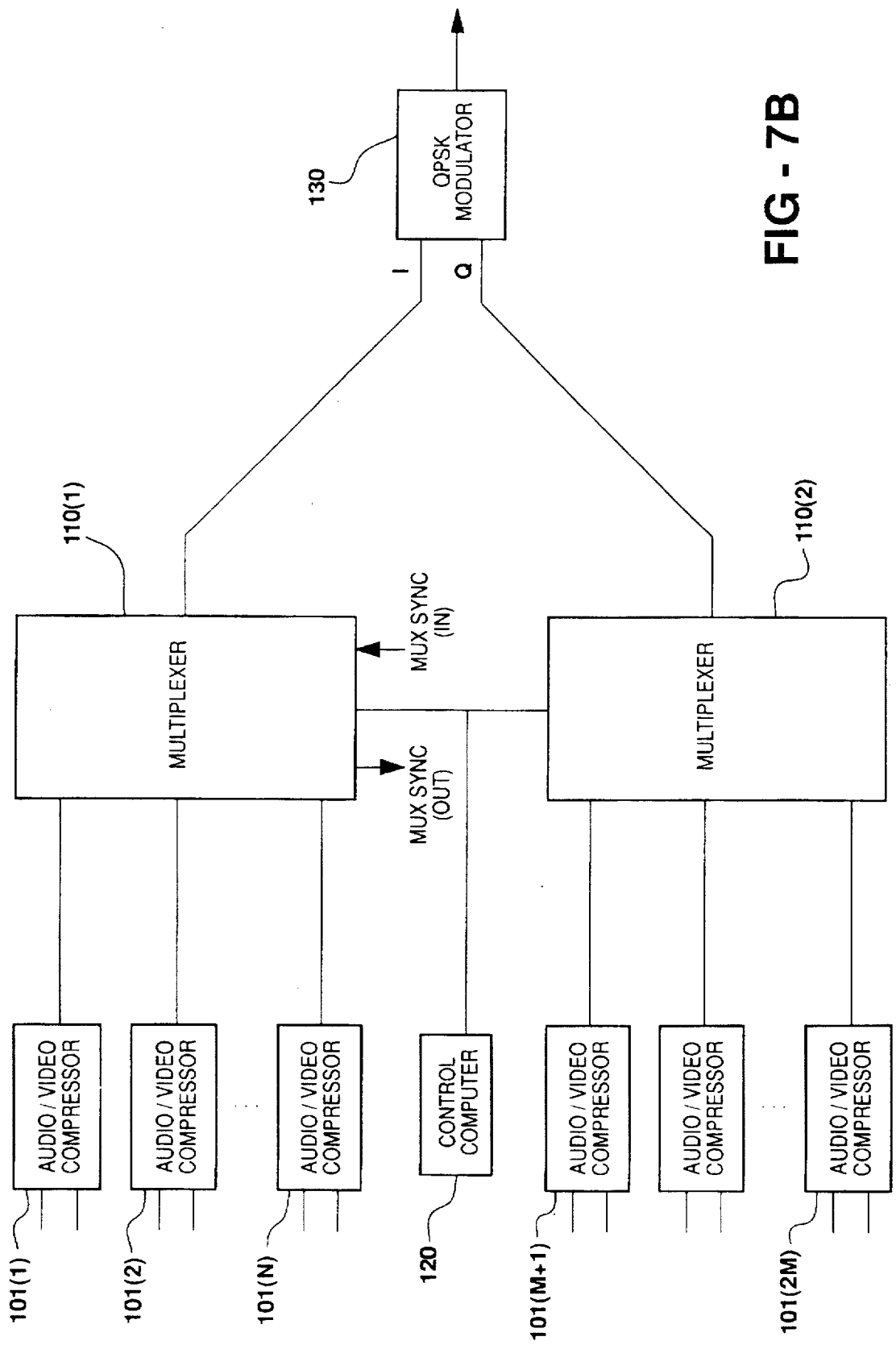
FIG. 7b shows a configuration wherein there may exist a plurality of multiplexed services for transmission via modulator of FIG. 3 all under control of a single shared control computer wherein the modulator comprises a QPSK modulator and the data streams for the services are combined as the I and Q inputs to the modulator for upconversion to cable or satellite frequencies.

Referring now to FIG. 7a and FIG. 7b, two arrangements are shown for providing multiplexers 110 in a hot-standby and dual I/Q QPSK modulator input configuration respectively. According to FIG. 7a showing a redundant configuration, two multiplexers are configured such that one is a hot standby for the other. Should, for example, multiplexer 110(1) fail for some reason, operation can be switched to multiplexer 110(2) through duplicated links from A/V compressors 101(1) to 101(m). Similarly, if one modulator 130(1), for example, fails, then whichever multiplexer is activated can input data to the other modulator 130(2) through duplicated links to each.

According to FIG. 7b, modulator 130 is a QPSK modulator having I and Q input streams, for example, at 21.5 megabits. Then, a plurality of 2 m services can be handled (in a non-redundant manner) by the depicted dual multiplex (single thread) configuration under control of control computer 120 at 43 megabits. One multiplexer, for example, 110(1) receives inputs from A/V compressors 101(1) to 101(m) while the other multiplexer 110(2) receives inputs from A/V compressors 101(m+1) to 101(2 m). In a cable environment, one advantage is that the I and Q data streams may be demultiplexed and provide outputs on two or three or more cable channels.

In the arrangements of FIGS. 7a, 7b or other arrangements involving plural multiplexers or other digital or analog data input equipment, it is typical for equipment to be synchronized utilizing a continuous wave signal for locking all equipment requiring a reference. For example in telecommunications systems, it is known to provide continuous "pilot" signals at various frequencies for regulation, alarms and/or protection switching control in steps of a multiplex above a channel bank level. For example, accurate pilot frequencies at 104.08 kHz, 100.8 kHz, 315.92 kHz, 2.84 MHz, 5.888 MHz and 13.92 MHz are generated to +or −0.1 dB.

For digital video compression, however, a more convenient frequency for a continuous wave clock signal is 13.5 MHz for reasons already described or multiples or submultiples thereof, especially, according to the present invention, 3.375 MHz (13.5 MHz/4). As a result, the phase lock loop design for locking to the frequency is simplified. Moreover, 3.375 MHz falls within the standard bandwidths of practically any known video format, either standard definition or high definition, and so can be carried over any conventional media including twisted pair, cable or optical fiber.

According to the present invention, a 50 Hz frame synchronization signal may be inserted to conform the digital "frame" of the present invention as already discussed. A synch signal at 50 Hz is one which is identically utilized in several different known or proposed television formats. On the other hand, the apparatus for generating a synchronizing signal for the apparatus of FIGS. 7a and 7b should not be construed so narrowly. A 60 Hz or other convenient interruption signal can likewise be employed as desired. The interruption (or trigger) signal signals an analog 3.3775 MHz signal generator to begin dampening to zero according to a cosine squared damping function and insert a special frame identifier signal at a predetermined location signal, for example, within one cycle of receipt of the interrupt signal. This special signal then signals a precise frame synch location, for example, by means of a zero crossing and preferably comprising one cycle of a sinusoidal waveform at a higher signal level but of significantly lower frequency; (see FIG. 8).

It is desirable to avoid complicated locking circuitry of the prior art and thus specially design the synchronization signal for locking various encoder location equipment (and decoder equipment, if necessary) wherever situated. The signal shown in FIG. 8 achieves this objective and is generated by interrupting at 50 hz the generation of the continuous wave signal of 3.375 MHz and 0.5 v pp. After receipt of the interruption signal, the signal size is increased in amplitude from its original size, for example, up to twice its size as shown, from 0.5 volt peak to peak to 1 v peak to peak (although in an alternative embodiment, one may select from the range 0.375 to 1 volt for the continuous wave signal and 0.75 to 2.0 volts pp for the marking signal depending on the application). A 1 volt maximum peak to peak signal has greater significance, however, in the television arts. The frame synch marker comprises a ramp-down (or ramp-up) portion to a maximum level of predetermined duration, a maximum level portion of the same duration in the opposite sense and a zero crossing coincident with the subcarrier's zero crossing between the two half cycles of maximum level. During a transition from the 3.375 MHz wave to the special marker signal portion, a one cycle duration cosine squared dampening section may comprise a single half-cycle wave half amplitude portion at 0.25 volt pp. (shown) followed by a full cycle at zero level signal. As a result, the signal according to the present invention has no DC component that can be AC coupled and no clamping is required. The signal that is generated incorporates a natural cosine squared dampening that results in no sharp transitions to upset any locking circuitry. On the other hand, the signal according to FIG. 8 is capable of being locked by any number of well known techniques, including frequency locking, zero crossing detection, amplitude detection, combinations of these or other conventional techniques. Also, the sync edge section corresponds to a cosine squared pulse having a half period of 590 nanoseconds (2 cycles) which results in a null at 3.375 MHz, preferably, the frame marking zero crossing. A multiple of 12 cycles defines the entire special marking signal. Six cycles precedes the frame marking zero crossing and six cycles follow the frame marking zero crossing.

Figure 9:
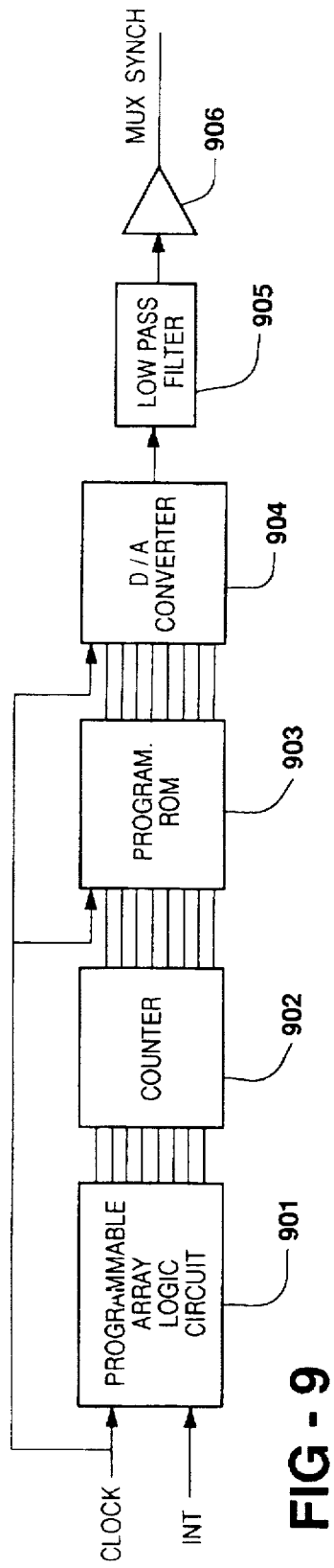
FIG. 9 is a schematic block diagram of a digital waveform generator for generating the synchronizing waveform graphically depicted in FIG. 8.

While the signal may be generated utilizing analog signal generators, referring now to FIG. 9, there is shown a digital waveform generator for providing a synchronizing waveform in accordance with the present invention and, in particular, the waveform shown in FIG. 8. The waveform generator comprises programmable array logic circuit 901 for generating addresses for addressing a programmable read only memory or other memory device 902. The PAL 901 receives clock signal, preferably at 13.5 MHz and controls counter 902 at the 13.5 MHz rate. Counter 902 addresses programmable ROM or other memory 902. Programmable ROM 902, in turn, outputs digital data in parallel representing waveform signal levels to be generated, the waveform of FIG. 8, to digital to analog converter 903 which outputs equivalent analog signals according to the input digital levels. The output digital values of digital to analog converter 903 are graphically shown in the waveform of FIG. 8; the boxes represent clocked outputs over time of D/A converter 904. For example, the 3.375 MHz wave is generated by outputing the values 128, 192 and 65 from PROM 903 to D/A converter 904 which may be stored at address locations of PROM 903.

In one embodiment of the digital waveform generator, counter 902 simply continuously counts through a sequence of numbers under control of PAL 901. Under control of PAL 901 then a counter continuously counts (outputs four PROM addresses) 0 (for 128 stored at that address), 1 (192), 2(128), 3(65) at each tick of a 13.5 MB clock and returns to 0 (128) until an interrupt signal (INT) is received. If the interrupt signal is received, the counter continues to count through additional addresses of the PROM 902 beyond 0–3 in stead of going back to 0, namely, 4(128), 5(192), 6(128), 7(96, half amplitude), 8–12 (128), 13 (123), 14 (109), 15 (84), 16 (65), 17 (40), 18 (20), 19 (6), 20–28 (1), 29 (11), 30 (38), 31 (79) and 32 (128), the frame marking zero crossing, and so on to 59 (65), or fifty-six additional addresses. Once the special waveform is generated under control of PAL 901 after the interrupt signal, counter 902 resumes counting addresses only 0 to 3 to generate the 3.375 MHz wave again until the next interrupt signal. While four addresses uniquely define a continuous periodic waveform, a greater number of addresses output at a faster frequency provides a better definition of the waveform.

In other embodiments, the functions of the counter are embodied in the PAL circuit 901. In yet other embodiments, the PAL circuit 901, counter 902 and memory 903 functions may be replaced by a simple microprocessor. Other embodiments of a digital waveform generator may come to mind of one of ordinary skill in the art from an appreciation and further study of the waveform of FIG. 8.

The output of the D/A converter 904 is then filtered at low pass filter 905 and amplified as necessary at amplifier 906 for delivery to any and all equipment requiring regulation, alarm signalling or switching input. The filter is preferably set to the low pass baseband of interest, for example, the video bandwidth, and the amplifier 906, typically an operational amplifier, provides assurance that the output signal is within predetermined level tolerances.

The waveform generator of FIG. 9 may be provided as a plug-in or other module of multiplexer 110 of FIG. 4 associated with clock 420 and coupled to synch inserter 458 for controlling synch insertion. The waveform generator of one such multiplexer; for example, 110(1), then may be a master and be provided with a convenient output port for controlling synchronization of other multiplexers slaved to it in arrangements such as FIGS. 7a or 7b or other equipment. In the alternative the waveform generator may be a separate stand-alone unit.

Now particular details are provided with reference to FIGS. 10 to 12 and included tables for the multiplex frame format of the present invention.

The Multiplex Frame Structure

The multiplex (MUX) frame structure is divided up into four (4) distinct sections: a highly error protected section which carries control data and non-repeating conditional access information (region 1 in FIG. 2b); a low data rate section (region 2 in FIG. 2b) which carries services requiring a data rate, for example, no greater than 64 Kbps such as teletext or utility data or optional service packets (region 1 and 2 together are defined as the packet region, PACKETS); a medium data rate section which carries services requiring data rates from 64K to 1 megabits per second such as MPEG audio (this is defined as the AUDIO region); and a high data rate section which carries services requiring data rates from 1M to 20M bps such as MPEG video (this is defined as the VIDEO region).

As explained previously, the MUX frame structure preferably has a structure which is composed of rows of bytes arranged into columns. The MUX may have from 2 bytes to 255 bytes per row (excluding BLOCK SYNC) and have from 1 to 511 rows.

Error Protection/Correction

The entire MUX frame, with the exception of the BLOCK SYNC and FRAME SYNC sections, is protected by a Reed-Solomon (RS) Error Correcting Code (ECC) which provides adequate protection for the service regions, but not enough for the control section (region 1) in the PACKETS section of the MUX frame.

The frame structure control section, which is the first part of the MUX frame has additional error protection because it contains the information which is used by a demultiplexer of a decoder to de-multiplex the MUX frame. The non-repeating conditional access section related to authorization of particular subscriber decoders to receive certain, for example, pay portions of the MUX also has additional error protection.

The rest of the MUX frame, which contains repeatable conditional access data, teletext, utility data, OSPs (optional service packets), audio, and video does not require additional protection. The decoder's demultiplexer will indicate when a detectable RS uncorrectable block occurs by passing on the error flag signal asserted (active low or high by convention) from the RS decoder and will output a corresponding signal, for example, in the opposite sense, and the data output should be appropriately handled by any peripheral device which is receiving the data. All bytes, even bytes indicated to be in RS Error, will be output from the demultiplexer to maintain byte alignment with the input data.

MPEG Header Detection

A decoder's demultiplexer may be designed to work with MPEG decoding units for audio and video, although not exclusively, but for the majority of such units (for example, those available from vendors such as C-Cube, SGS-Thomson, TI and L.S.I. Logic). As such, a feature has been added to the DEMUX 612 (FIG. 6a) which stops erroneous data from being output, for example, as Video data when an uncorrectable RS block error occurs. The demultiplexer of a decoder requires that the decoder micro-processor indicate that the selected Video Channel Stream must have the MPEG header detection activated.

The demultiplexer 612 will perform the following on the data being output on the bus 610 when a RS Error occurs. The MPEG "Error Start Code" will be asserted on a Video data port or bus of the demultiplexer 612. Since there may be typically two Video data streams active in the demultiplexer integrated circuit, both streams must be individually controlled. It should be noted that the DEMUX expects all MPEG data to be perfectly byte-aligned as it will not attempt to find non-byte aligned start codes.

Forward Error Protection

The region 1 section of the MUX frame which contains additional error protection uses a convolutional (3,2,13) Forward Error Correction (FEC) code in combination with 5:1 majority logic to provide a high probability of error-free information to be available for controlling the system. The 5:1 majority logic is interleaved over a byte to increase error tolerance of the data. The Reed Solomon error correction code (RS ECC) may corrupt bytes of data if it is unable to correct them at a decoder. By interleaving the majority logic values over a byte, the system provides for further robustness under high gaussian noise conditions.

In the demultiplexer 612 of the decoder, the 5:1 majority logic is performed first and its results are then fed into the convolutional (3, 2, 13) FEC. The FEC has the following taps: $g_1=\{0, 8, 9, 12\}$; $g_2=\{0, 6, 11, 13\}$. The actual design in the DEMUX 612 maintains proper byte-alignment byte extending the FEC to be a (3, 2, 13+3) FEC using the correction taps of the (3, 2, 13) FEC. The convolutional (3, 2, 13) FEC is set to the zero state (all registers cleared) before any data is entered. This occurs during the FSYNC word of the MUX. It will take ((13+1)*3*5) MUX data bits to be entered into the FEC before any corrected information bits are available as output from the FEC registers (not shown) of the demultiplexer 612. All internal delays are not apparent outside the DEMUX 612.

The (3, 2, 13) FEC requires a "run-out" to allow for all of the useful data to be removed from a convolutional first-in-first-out (FIFO) memory (not shown). The "run-out" normally required would be 3*13=39 bits, but by having prior knowledge of the location of the parity bits, the number of transmitted bits can be reduced to 13 bits. Therefore, the required bits to be transmitted are the syndrome parity bits generated inside the multiplex encoder 110. The data bits which are entered into the encoding FEC are set to zeros (00) and the same is true in the DEMUX 612. This saves 26 bits of otherwise useless data. These 13 "run-out" bits must still be 5:1 majority protected; therefore, the total number of bits in the MUX required for FEC "run-out" will be 65+15 bits, because everything must be byte-aligned. Therefore, the runout which follows all FEC protected packets is 10 bytes long, or 2 bytes of "run-out" parity bits which are then 5:1 majority logic encoded.

If an error exists in the highly protected data section (region 1 of FIG. 2b) of the MUX frame, the DEMUX 612 may not perform its functions properly and unpredictable results will occur. According to statistical probabilities, when this section does get corrupted, the rest of the MUX data will contain too many errors for proper decoding.

Multiplex Packets (PACKETS)

The MUX contains all of the system related packets directly after the FRAME SYNC word with the Multiplex Structure Control Packet (FIG. 10) being the first one because it determines how the frame has been defined. The MUX frame structure is rigid with respect to the way in which the packets are defined, but the values within the packets are defined over time as a sequence of MUX frames are transmitted and adapted for different data service requirements.

There are three groups of packets in the MUX frame, each of which is handled differently. The first group is the DEMUX packets which control the demultiplexing of the MUX frame; the second group is the Micro-Support packets which are used by the decoder microprocessor (DCP 158, for example, in FIG. 1); and the third group is the Optional Service packets (OSP).

The order in which the packets are located within the MUX frame is predetermined so that the demultiplexer 612 knows where the packets are located.

The DEMUX Packets

The DEMUX packets are used by the DEMUX section of the demultiplexer application specific integrated circuit (ASIC) 612 of a decoder to determine where the different data bytes for all the data services are located in the MUX frame. All of these packets are not visible outside of the demultiplexer ASIC. These packets have additional error-protection and are included in region 1 (FIG. 2b).

The demultiplexer expects to receive its packets in a specific order: MSC (multiplex structure control) packet; ACPs (Audio control); VCPs (Video control); ASDPs (Audio service descriptor); and VSDPs (Video service descriptor). The actual location of the ASDPs and VSDPs may be changed but it makes the Multiplex encoder's task simpler if this order is followed as the ASDPs and VSDPs are optional packets.

The ACPs, VCPs, ASDPs, and VSDPs are grouped together into the category of "45 byte packets" which is their length including the additional FEC protection. They each contain 6 bytes of information which is used for routing in the demultiplexer 612 of the decoder; (see FIGS. 11 and 12).

Frame Structure Control

Referring now to FIG. 10, the MUX frame structure is defined by the Multiplex Structure Control (MSC) packet which is the first packet following the FRAME SYNC or vertical synchronization word. The MSC packet determines how the information contained within the MUX frame is to be demultiplexed into appropriate data processors 618, 620, 622, 630 via bus 610. The micro-processor 614 will be responsible to initialize the demultiplexer 612 with a multiplex variant value which corresponds to the MSC's structure type header. The DEMUX 612 must have a match or it will not release any of the information from the MUX frame. The demultiplexer ASIC 612 will only de-multiplex the data which corresponds to the selected specifications. The DEMUX 612 does not permit excess flexibility by allowing for too many sections of the multiplex variant to be programmable, as this costs silicon area.

The MSC packet is particularly arranged, according to FIG. 10, to permit the DEMUX 612 enough time to extract all of the required information from the packet before actual data is to be output on an output spigot, preferably bus 610. This packet is additionally error-protected within region 1. The demultiplexer 612 is preferably designed to work with only the MSC packet while the rest of the MUX frame is used for Audio and Video data. This minimal overhead allows for better bandwidth utilization in a frequency division multiplexed MUX.

Audio Control Packet

Referring now to FIG. 11a, the Audio Control Packet (ACP) determines how the medium data rate service(s) (Audio) are to be de-multiplexed. The Audio service is sectioned into byte packets which are then subdivided up into a maximum of 64 different audio services. Audio service may be of any information type from MPEG Audio, Sedat Audio, or any medium data rate service.

The ACP is determined to be this packet by the demultiplexer 612 which uses the unique Descriptor Header value. The header value will be a predetermined binary value of, for example, "100010" for this multiplex variant, and this value cannot be changed without changing the variant number. Each packet describes at most 10 audio services, therefore to facilitate 64 audio services 7 ACP packets are required. When the number of audio services is not related to 10, a counter value of the unused audio portion should be set to zero. If the sum of all the counter numbers exceeds the number of bytes/block value of the MSC, audio information will not be correctly output from the demultiplexer 612.

The order that an audio service's numbers of bytes are located in the frame format determines their relative position in the actual audio byte packets of the audio section. The demultiplexer will select the first and last byte location values (from the audio bytes/block number) for two authorized audio services. The relative starting position of the first byte for the required audio service equals the sum of all the previous counter values and number of bytes for this authorized service determines its stopping byte location. The DEMUX 612 will add the number of bytes which are used in the audio byte packet, and the total must equal the number of bytes/block of the MSC; if not, then, an invalid condition will exist and invalid audio information may be output from the DEMUX 612.

The Audio Service Descriptor Packet (ASDP)

Referring now to FIG. 11b, the Audio Service Descriptor Packet (ASDP) is a non-essential packet for this particular multiplex variant type, but it is used to distinguish the different audio for the purposes of de-multiplexing control of the DEMUX 612. The ASDP is determined to be this packet by DEMUX 612 which uses the unique Descriptor Header value. The header value may be, for example, binary value of "100011" for this variant, and this should be fixed and predetermined. Each packet describes only one Audio service and contains the audio service number which it is to be used with. The demultiplexer 612 parses all ASDPs and looks for the required audio service match, if no match occurs, then there is no DEMUX specific information about the audio stream data, and it may be output normally. The demultiplexer 612 will only handle the two authorized audio service streams.

The information contained within this packet are: Audio Service Stream Number, this must be in the range from 00 to 63; the total number of bytes of Audio stream data contained in this frame for the selected audio service.

This multiplex variant allows for "dead-time" at the end of audio data of the frame, and this counter value allows for flexibility because it permits each Audio stream a "dead-time". The "Number of Bytes" value should be in bytes.

Video Control Packet (VCP)

Referring to FIG. 12a, the Video Control Packet (VCP) determines how the high data rate services (Video) are to be demultiplexed. The Video service is sectioned into byte packets which are then sub-divided up into a maximum of 20 different video services. Video service may be of any information type from MPEG Video, HDTV video, or MPEG system data which contains both video and audio. Video data may also comprise high resolution film (motion picture for example) media converted into convenient transmittable form, if not HDTV video.

The video packet is determined to be this packet by DEMUX 612 which uses the unique Video Header value. The header value will be a predetermined binary value for this multiplex variant of, for example, "100100". Each packet describes at most 5 video services, therefore to facilitate 20 video services 4 packets are required. When the number of video services is not related to 5, the counter value of the unused portion must be set to zero. If any counter number exceeds the number of bytes/block value of the MSC (FIG. 10), it will be assumed to be invalid and no video information will be output from the DEMUX 612.

The order in which video service's numbers of bytes are located in this multiplex variant determines their relative position in the actual video byte packets of the video section (FIG. 2a). The DEMUX 612 will select the values for two authorized video services by determining the relative starting position of the first byte for the required video service and number of bytes to be demultiplexed. The DEMUX 612 will add the number of bytes which are used in the video byte packet and it must equal the number of bytes/block of the MSC, if not, then an invalid condition will exist and no information may be output from the DEMUX 612.

Video Service Description Packet (VSDP)

Referring to FIG. 12b, and like the ASDP, the Video Service Descriptor Packet (VSDP) is a non-essential packet for this demultiplexer variant, but it is used to distinguish the different videos for the purposes of demultiplexing control of the demultiplexer 612. The VSDP is determined to be this packet by DEMUX 612 which uses the Descriptor Header value. The header value may be, for example, the unique binary value of "100101" for this variant, and this, like the ASDP header, is predetermined. Each VSDP packet describes only one Video service and contains the video service number which it is to be used with. The demultiplexer parses all VSDPs and looks for the required video service match, if no match occurs, then there is no DEMUX specific information about the video stream data, and it may be output normally. The demultiplexer 612 will only handle the maximum two authorized video service streams (as per conditional access data).

The information contained within this packet are: HDTV Service Stream or Video Service Stream Number, this must be in the range from 00 to 31; an HDTV video flag for identifying the HDTV character of the stream and the total number of bytes of Video stream data contained in this frame for the selected video service.

The multiplex frame allows for "dead-time" at the end of the frame and this counter value allows for flexibility because it permits each Video stream a "dead-time". The "Number of Bytes" value must be in bytes.

Micro-Processor Control Packets

The Micro-Processor Control packets are used by the packet management section of the demultiplexer ASIC to interface the incoming MUX information to the decoder micro-processor. There are 5 different sizes of packets which are transmitted in the MUX: 75 byte packets; 10 byte packets; 5 byte packets; 32 byte packets; and 42 byte packets (like the low speed data packets already described). The packet management section recognizes the type of packet by its packet header which is indicated by a "start of packet signal" by the DEMUX. The DEMUX does not interpret any of the information within these packets, rather it is expected that all of the information will be deciphered inside of the demultiplexer 612.

75 Byte Packets

The 75 byte packets are additionally error protected, and they carry 10 bytes of information. This variant will normally transmit non-repeating data using these packets, these packets must arrive "error-free" to permit proper decoder operation.

An example of a 75 byte packet is the Authorization Seed Packet (ASP) which contains the cyclic seeds required to decrypt the next crypto-session's services. The seeds are transmitted using 75 byte packets. The ASP structure may be further described in application Ser. No. 160,830, entitled "System and Method for Transmitting and Receiving Variable Length Authorization Control for Digital Services". The 75 byte packets may be used to transmit the ASP, but not exclusively, for example, when a higher level of error protection is required for the authorization seed data.

10 Byte Packets

The 10 byte packets are only protected by the RS ECC and as such are repeated several times during a "crypto-session" to guarantee that they arrive "error-free". These packets contain a checksum which is used by the micro-processor to verify that the packet arrived error-free.

The Cyclic System Data is one example of data which may be transmitted using 10 byte packets. This data may be further described in application Ser. No. 160,830, entitled "System and Method for Transmitting and Receiving Variable Length Authorization Control for Digital Services", incorporated herein by reference.

5 Byte Packets

The 5 byte packets are only protected by the RS ECC and as such are repeated several times during decoder operation to guarantee that they arrive "error-free". The packets contain a checksum which is used by the micro-processor (DCP 158 in FIG. 1) to verify that the packet arrived error-free.

The Composite Virtual Channels Data may be transmitted using the 5 byte packets, but not exclusively. The structure of the packet is described in U.S. patent application Ser. No. 160,848, entitled "System and Method for Simultaneously Authorizing Multiple Virtual Channels", incorporated herein as necessary by reference.

32 Byte Packets

The 32 byte packets are only protected by the RS ECC (region 2 of FIG. 2b) and as such are repeated several times during decoder operation to guarantee that they arrive "error-free". The packets contain a checksum which is used by the decoder micro-processor (DCP 158 in FIG. 1) to verify that the packet arrived error-free.

The Virtual Channel Packet may be transmitted using 32 byte packets. These packets contain the information required by the decoder micro-processor to determine where a requested channel actually is located within the various multiplex channels. The structure of the Virtual Channel Packet is described in (44891-A-550).

The Addressed Data Packet (ADP) may also be transmitted using 32 byte packets. The ADP is used to provide decoder specific information to the decoder micro-processor, not exclusively. Each ADP has a USER-ID value of 32 bits which corresponds to the decoder's unique address. The demultiplexer will only select the ADPs which match the decoder micro-processor selected USER-ID.

42 Byte Packets

The 42 byte packets are only protected by the RS ECC (and so fall in region 2) and, depending upon the type of information within the packet, the packet may be discarded by the demultiplexer 612 or the packet may contain a checksum which is used by the decoder micro-processor to verify that the packet arrived error-free.

The Teletext Packet (TTP) is one example of a packet transmitted using 42 byte packets. The teletext processing section of demultiplexer 612 will only allow the capture of a TTP when there is no RS Block Error indicated. Therefore, the text processing elements 618 of a decoder expect that the time to perform a "teletext page grab" will depend upon the number of times that a packet is transmitted in the MUX and how many errors the transmission channel is experiencing when the TTP arrives at the decoder. Further detail on teletext service provision is described in U.S. application Ser. No. 160,827, entitled "System and Method for Providing Compressed Digital Teletext Services and Teletext Support Services", incorporated herein as necessary by reference.

The Utility Data Packet (UDP), already described, is another example of a 42 byte packet. The UDP provides a low bit rate channel for any information which is to be output directly from the decoder using data rates, for example, from 300 to 38,400 band or higher rates. The actual data rate clock will not be "perfect" and may contain some jittering, hence, rate trim as described already above. There is a maximum of 16 utility data channels supported by the described multiplex variant and are determined by their Service number. If any errors exist in the packet, they will be output on the serial utility data port.

Optional The Service Packets (OSP)

The Optional Service Packets (OSP) are used to output any type of packet information which does not fit into the normal "concept" of this multiplex variant. Another way of describing OSPs is by way of FIG. 6a where only certain types of peripheral processors are shown 618–630. But, if a particular service cannot be handled by these, it may be most efficiently handled by an OSP processor (not shown) but still connectable to bus 610 via the included expansion socket. To facilitate any future growth of this variant, the packet transmission of the OSP has been designed to handle any size packet from 1 byte to 255 bytes in length. The OSP length is fixed for an entire MUX Frame, but the packet size may change on a frame basis. The size of the OSP is defined in the MSC and controlled by the DEMUX 612. The data is protected by the RS ECC (and so are carried in region 2) and a detectable RS error is indicated via an external error signal from demux 612.

The OSP data is output both in a parallel (byte-wide) mode and a corresponding serial mode. The beginning of an OSP packet is indicating by a pulse which frames the first byte of the packet. The OSP will not be decrypted by the DEMUX and any authorization will have to be done by the external OSP processor device which is processing the OSP information (not shown) but connected to bus 610..

Referring to the following table, one possible OSP configuration packet may comprise a packet header, a service number and a data field.

| Description | Bits |
| --- | --- |
| Optional Service Packet Header | 8 |
| OSP Service Number | 8 |
| OSP Data | 8 |

The anticipated packet transmission protocol for the MPEG II will require that the DEMUX output all MPEG II packets out of the OSP port. The DEMUX expects that the external MPEG II device will handle all of the routing of the MPEG II services and as such no other MPEG II packet protocols have been implemented in this variant.

DEMUX CDR Interface

The Clock Data Recovery (CDR) ASIC 584 indicates the beginning of a multiplex frame by the use of the FRAME SYNC pulse (active high or low, by convention) which is timed such that the falling edge of the pulse coincides with the first byte of frame data. This byte is defined as byte 0 of the multiplexer frame. The first byte of frame data is the reference for all demultiplexing and is used to re-synchronize the data stream. The CDR 584 preferably has an included programmable register which allows for the decoder control micro-processor 581 to modify the exact location register of the FRAME SYNC pulse. Once set, this register does not need to be updated as the offset is due to the data FIFO delay inside of the Reed-Solomon RS decoder 588.

Data bytes entering the demultiplexer circuit 612 are enabled by a signal called DVALID (not shown) which is asserted from the RS Decoder 588 and "frames" the data section of a RS block. The DVALID signal must be byte aligned with the data bytes entering the demultiplexer circuit 612. The circuit 612 expects the DVALID to be asserted (high or low by convention) on the first byte of data and de-asserted after the last byte (of a RS block) has entered. The RS Decoder 588, for example, one available from LSI Logic, performs this function and the demultiplexer circuit 612 is designed to interface with this device.

The demultiplexer circuit 612 only retains the decryption information between multiplex frames and as such requires the first 135 bytes of information to be the Multiplex Structure Control packet (MSC). (There are 18 bytes of information in the MSC.) This packet is used by the demultiplexer to determine how the MUX frame was constructed in the up-link Multiplex Encoder (FIG. 1). The MSC contains a Structure Control Type (FIG. 10) which must match the MUX-Variant register, microprocessor controlled, for the demultiplexer 612 to begin de-multiplexing the MUX frame. If a match does not occur, the demultiplexer 612 will indicate that a MSC MUX variant mis-match has occurred to the decoder control micro-processor 158 (FIG. 1) and mute all data from its outputs.

The Reed Solomon Circuit 588 also preferably provides an error signal which indicates that the RS block data has a detectable error. This error signal is output from the demultiplexer 612 so that it is co-timed with the data being output. If an error occurs with the demultiplexer control packets which is not correctable by the additional FECs, the output of the demultiplexer 612 may be indeterminate.

DEMUX Channel Changes

The DEMUX has two different types of channel changes: an Inter-MUX Channel change (controlled by CDR Lock) and an Intra-MUX Channel Change (Micro-Processor controlled).

The Inter-MUX channel change is controlled by the CDR 584 which indicates that the CDR has found a valid MUX frame. During a channel change, the CDR Lock signal is de-asserted (low or high by convention) and the DEMUX 612 does not output any data on its service ports or bus 610.

The time required for a channel change is dependent upon the time used by the demodulator circuit to locate the required channel, the time required by the CDR 584 to locate both the horizontal and vertical synchronization words, the time required by the decoder microprocessor to locate the appropriate authorization seeds for the service, and the time required by the MPEG decoder (video processor 630) to output the required stream.

The Intra-MUX channel change is controlled by the micro-processor 581/614 which changes the service which is output by selecting another service. This change is done by the micro-processor writing to a service channel number register (not shown). The demultiplexer DEMUX 612 expects that this channel change occurs during the last frame of a "crypto-session".

The time required for a channel change is dependent upon the time required by the MPEG decoder (for Audio 620 or Video 630) to output the required stream.

The teletext processor 618 requires that the micro-processor 614 write to any channel selection registers on the last frame of a "crypto-session". For any channel change, the DEMUX 612 expects that its output services will be "muted" and the MPEG decoder 620, 630 be informed of the channel change. Once a new MUX has been located, by the CDR lock signal and the DEMUX micro-interrupt, the required service authorization seeds must be located and processed. After the "crypto-session" boundaries have been located the decoder micro-processor 614 must write to the DEMUX channel selection registers during the last frame of the "crypto-session". The mute service outputs can then be turned off at any time.

Multiplex Services

The Multiplex frame may contain both audio and video services which will be globally encrypted (encryption block 415) and decrypted using a global decryption circuit (not shown) which comprises a portion of demultiplexer 612. The global decryptor may comprise any of a number of known means for decryption depending on known means for encryption and may have, for example, a total of 56 seed bits. The DEMUX 612 requires the actual channel number for all services which are to be output on the DEMUX Data Bus (DMB) 610 to be loaded into the correct register before a crypto-session boundary. The DEMUX 612 will only change channels on a crypto-session boundary, but the "MUTE SERVICE" control of the decoder micro-processor can be asserted at any time to stop the output of data on the DMB 610.

The teletext service is not globally encrypted and all teletext packets are passed to the text processor 618 for further processing. If any decryption of teletext is required, it must be done by a post-processsor such as a text processor 618. Similarly, if utility data is encrypted, decryption would be accomplished at low speed data processor 622.

The DEMUX data Bus (DMB) 610 provides the outside interface at least for all medium (audio) and high (video) rate services handled by this variant. The DMB 610 is, preferably, a combination serial and 8 bit parallel bus with the appropriate enable signals. Each of the services supported by the DMB 610, of which there are five (video, audio, utility data, text and optional service), have their own enable signal. To facilitate the parallel transfer mode, a byte clock is provided which is generated from a serial data bit clock. All signals preferably transition on the positive edge of clock, therefore signal hold times may be a problem and enable timing is suitably precise.

All audio and video decoding processors 620, 630 must be connected to the DMB 610 to permit them to receive the appropriate information. For example, the DEMUX 612 may output all video services out the DMB 610 with the video enable lines active at certain times and similarly for the audio data at other times.

Video

The DEMUX will output a maximum 2 MPEG or other video services through the DMB 610, and each video service contains its own active high enable signal which frames the serial data. All data and control signals transition on the positive edge of bit clock. The decoder micro-processor must select the correct video service that it wants to have the data transmitted to the decompression engine. If the microprocessor selects a video service which does not exist, the DEMUX 612 will indicate this via a register used to report status control, a 1 (or 0 by convention) in this bit means an error has occurred. A video service does not exist when it is not described by any VCP packet.

Each video service has its own video decryptor which is active only for the specified channel data and is shut down (not clocked) for any other service. The video decryptor has a seed length of 32 bits which are contained in 4 different registers. The video seed is loaded into the decryptors at the beginning of the crypto-session from the micro-programmed registers.

The VSDP packet determines if the video service should assert the HDTV signal which indicates that HDTV mode has been selected for the video service. Both video services can be HDTV, therefore there may be preferably 2 HDTV ports on the DEMUX 612. If the VSDP packet contains the number of bytes count, the DEMUX 612 will stop the video enable of the corresponding service from being asserted after the byte count has reached zero. The byte count must be equal to the actual number of bytes because the value is checked before the enables are output. In other words, if the total number of bytes is 1000, then the value must be 1000 and not 999. If a VSDP packet has a byte count of 0 or there are no VSDPs for a specific service, then all possible bytes for the service will be routed to the video processing engines 630.

The Video services may also be considered as re-assigned video services which are routed to another video processor 630. The use of re-assigned video data is controlled by the decoder micro-processor. A video service will be indicated as a normal video service or a re-assigned video service by the corresponding enable signals. Normally, HDTV will only be handled as a re-assigned service because the HDTV format may not be compatible with the decoder's particular normal video decompression engine 630.

Audio

The DEMUX 612 will preferably output a maximum 2 audio services through the DMB 610 simultaneously, and each audio service contains its own active high enable signal which frames the serial data as with video. All data and control signals transition on the positive edge of bit clock. The decoder micro-processor must select the correct audio service that it wants to have the data transmitted to the audio decompression engine 620. If the decoder micro-processor selects an audio service which does not exist, the DEMUX 612 will indicate this via a register used to report status control; a 1 (or zero by convention) in this bit means an error has occurred. An audio service does not exist when it is not described by any ACP packet.

Each audio service, like video, may have its own audio decryptor which is active only for the specified channel data and is shut down (not clocked) for any other service. The audio decryptor has a seed length of, for example, 24–32 bits which are contained in 3 or 4 different byte-size registers. The audio seed is loaded into the decryptors at the beginning of the crypto-session from the micro-programmed registers.

The audio services may also be considered as re-assigned audio services which are routed to another audio processing engine 620. The use of re-assigned audio data is controlled by the decoder micro-processor. An audio service will be indicated as a normal audio service or a reassigned audio service by the corresponding enable signals.

Optional Service Packets (OSP)

The optional services information contained within OSPs are output using the DMB 610 with a corresponding active high (or low by convention) enable pulse which frames the data to processors (not shown). The OSP processing device must be capable of recording that OSP data is on the DMB 610, determine if the OSP data is the required service, decrypt the data if encrypted, and process whatever data is contained within the OSP. The OSP data will not be globally encrypted, nor will it have its own decryptor. This facilitates the use of OSPs for future use without any restrictions on it.

The DEMUX 612 determines that the packet is an OSP by its header and the entire packet, including the header value is transmitted on the DMB.

Utility Data

All utility data is contained within one or more packets which are transferred via the DEMUX ASIC 612's 8 bit bus. The DEMUX 612 will only look for the headers of the UDP for routing purposes. The actual outputing of this data is control by a decoder micro-processor interface section of the demultiplexer ASIC 612 to utility data processor 622.

Teletext

The DEMUX 612 will determine if a packet is a TTP by its header information and transmit the entire TTP to a teletext processing section of the demultiplexer 612. This section should be able to handle the maximum data rate of the transmission media without loosing any data.

All TTP must be of the same length. The DEMUX 612 can not handle TTPs of different lengths because it is looking for the header which is expected to be in a specific location.

The actual outputting of this data is controlled by a decoder micro-processor interface section of the demultiplexer 612 to text processor 618.

Service Channel Changes

The service channel may only be changed on a crypto-session boundary because of the decryption process. If the decoder micro-processor knows that it wants to change a channel, it should assert the "mute service" bit of a register which is examined on each frame boundary before it changes service channels. This will prevent any extra information from entering the decompression engines 618, 620, 622, 630 prior to a channel change and allow for a simpler mechanism of indicating a channel change to these engines without the interference of valid data being inserted into their input ports.

When selecting a new channel, all channel specific information must be available to the DEMUX 612 before the next crypto-session boundary. Once a channel is changed, all previous information is cleared when the new information is loaded into the control registers. Since all information describing all services is available every frame, there will not be any inherent storage in the DEMUX 612, thus if a Data Integrity failure occurs the entire frame of information is lost and the DEMUX 612 waits until it receives the next FRAME SYNC pulse.

A selected channel must exist in a frame, if the selected channel does not exist then the DEMUX 612 will indicate this by use of a bit in a status register.

Video

The DEMUX 612 uses the information contained within the MSC (FIG. 8) to determine how large the video blocks are, the maximum size can be 256 bytes long since there are 8 bits. This number is stored for the duration of the frame in memory of the DEMUX 612. The End of Audio Marker is used to determine where video starts. The audio marker indicates the last byte location of audio and it uses a 17 bit number which is compared with the internal byte counter. After a match occurs, the next byte (audio marker +1) contains the first byte of the video block. The video block counter, which is 8 bits, is used to route the video block into the selected services.

The VCP packet contains the number of bytes used for each video service but the actual byte starting location must be calculated by adding the number of bytes used for each previous service. There is one adder which adds the bytes used and when the selected video channel is reached, the adder's value and the number of bytes for the selected channel are stored in a register before the byte number is added. This provides both the starting location and the number of bytes which need to be routed to the video service spigot. Since there are 2 possible video services which are to be de-multiplexed, the DEMUX 612 contains 2 sets of location registers. The adder's value is not allowed to exceed the value for the number of bytes contained in the video block.

Once the bytes have been de-multiplexed from the video block, they are routed to the video service decryptor block. During a specific test mode, the data will not be run through the decryptor block, rather it will be passed directly to the DMB 610.

The byte allocation counter is still incrementing and once the end of video markers value, as indicated by the MSC, is reached, all de-multiplexing is completed. If a FRAME SYNC occurs before the end of video marker position, then the DEMUX 612 will be re-synchronized and the normal de-multiplexing will occur. No error condition will be indicated if this occurs.

When the video service selected has a corresponding VSDP (FIG. 12b), the value contained in this VSDP is stored and compared with the byte allocation counter. Once a match occurs, the DEMUX 612 will turn off the video service enable signals but all "dead time" bits will not be passed through the decryptors and output on the DMB 610.

Audio

The DEMUX 612 uses the information contained within the MSC to determine how large the audio blocks are, the maximum size can be 256 bytes long since there are 8 bits. This number is stored in memory for the duration of the frame in the DEMUX 612. Referring to FIG. 8, the End of Packets Marker is used to determine where audio starts, the packets marker indicates the last byte location of packets, and it uses a 17 bit number which is compared with the internal byte counter. After a match occurs, the next byte (packets marker +1) contains the first byte of the audio block. The audio block counter, which is 8 bits, is used to route the audio block into the selected services.

The ACP (FIG. 11a) contains the number of bytes used for each audio service, but the actual byte starting location must be calculated by adding the number of bytes used for each previous service. There is one adder which adds the bytes used and when the selected audio channel is reach, the adder's value and the number of bytes for the selected channel are stored in a register before the byte number is added. This provides both the starting location and the number of bytes which need to be routed to the audio service spigot. Since there are 2 possible audio services which are to be de-multiplexed, the DEMUX 612 contains 2 sets of location registers. The adder's value is not allowed to exceed the value for the number of bytes contained in the audio block.

Once the bytes have been de-multiplexed from the audio block, they are routed to an audio service decryptor block. During a specific test mode, the data will not be run through the decryptor block, rather it will be passed directly to the DMB 610.

Referring to FIG. 6, the functions of the demultiplexer 612 will now be described. The two major functions of the demultiplexer are to demultiplex the various services in the received frames and to provide microprocessor interface support. Its functions include: demuitiplexing of Mux Data services from CDR circuit 584, decryption of Mux analog and video services, microprocessor conditional access data interface, addressed data packet filtering, virtual and composite channel packet filtering, text packet filtering, text character generator, and utility data generator. Text and virtual channel details are provided in concurrently filed applications Ser. Nos. 160,827 and 160,848.

The demultiplexer 612 will be clocked by the data clock from CDR 584 and the micro support functional elements thereof will be clocked at 27 MHz and 13.5 Mz clock. These clocks are phase locked to the input data rate by the CDR 584.

All packets sent to the demultiplexer 612 contain a 4 bit packet type header and a 4 bit decoder type.

The decoder type must also be matched for packets to be valid. The decoder control processor loads the 4 bit decoder type for the demultiplexer to filter. If, for example, the decoder type in the packet header or loaded by the decoder processor is 0, then all decoder types are accepted by the demultiplexer.

Conditional Access Packet Processing

The System Data Packet (SDP) for transmitting conditional access data is one of the 10 byte packets briefly described earlier. The demultiplexer 612 will buffer up to 32 SDP's per frame. If more than 32 SDP's per frame are sent in the Mux frame then the demultiplexer 612 will ignore the extras. The demultiplexer 612 will preferably count the number of SDP packets in the buffer for the decoder control processor 614. The SDP counter will reset on every session.

The demultiplexer 612 will set a SDP received flag in a STATUS0 register. Then, the processor 614 will read the SDP count via Status register 2 and the SDP data via a Read RAM command.

The Virtual Channel Packet (VCP) may be a 32 byte packet. The demultiplexer 612 will compare Virtual Channel numbers with the number requested by the decoder processor. If the number matches, then the Virtual Channel packet is stored into the RAM (not including Header ID). The demultiplexer 612 will store, for example, up to 8 Virtual Channel packets per session. If more than 8 are sent, then it will ignore any extra packets. The Virtual Channel received status flag is set when the packet has been written into RAM. The demultiplexer 612 will count the number of VCP's received for the decoder processor 614. The VCP counter will reset on every session.

The demultiplexer 612 will set a VCP received flag in the STATUS0 register. Then, the processor 614 will read the VCP count via Status register 2 and the VCP data via the Read RAM command.

Composite packets are 5 bytes. The demultiplexer 612 will filter the CP's with the Virtual Channel number. If more than one Composite Packet with the same Virtual Channel number has been received then the previous Composite Packet will be overwritten.

The demultiplexer 612 will set the VCP received flag in the STATUS0 register. Then, the processor will read the Composite Packet via the RAM Read command.

Seed Packets are 10 byte packets (after error correction). Up to 64 Seed Packets will be buffered. Any extra packets sent will be ignored by the demultiplexer 612. The Seed packets must be stored in concatenated form to allow the processor 614 to easily calculate any offsets.

The demultiplexer 612 will set the Seed received flag in the STATUS0 register. The DCP 614 will read the data via the Read Ram command. The demultiplexer 612 will keep a count of the number of seed packets in the status 3 register.

The demultiplexer 612 will compare the Clear Addresses in the Addressed data packet with both of the two Clear Address loaded by the processor 614. If the address is found then the packet is written into RAM.

The demultiplexer 612 will be preferably able to store up to 16 ADP's of 32 bytes maximum length. The buffer will be implemented in a circular FIFO buffer fashion. If buffer is full then any additional ADP's will overwrite the out pointers'ADP's. The out pointer will still have to increment to the next ADP. Please note that on "power up" the in and out pointer will be random, therefore the decoder processor 614 must send a reset ADP command to set the in and out pointers to equal (reset both in and out pointers of offset of 0).

The demultiplexer 612 will support 2 user address compare registers. Either register must be equal to pass the ADP. A read of the ADP FIFO register will return the contents of the FIFO. The decoder processor 614 will control when to increment the FIFO pointer by setting the appropriate control flag in the ADP Control register.

The buffer area required is 16 ADP's * 32 bytes=512 bytes.

Text Packet Processing

Text packets consists of Header packets and Text data packets. The Header packets will contain page number, character set number, starting row number and flags for encrypted page, boxed page and linked page.

The demultiplexer 612 will compare the page number of the Text Header packet with the page number requested by the micro. If the page number is found then the following Text Data packets are written into RAM until a new Header packet is received.

The demultiplexer 612 will be able to store up to 16 text pages including Header row data and have 4 page number compare registers. When a page has been received and written to the RAM then a page grabbed status flag will be set for the decoder processor 614. The DCP command structure will be Page grab command, page number, compare register number (0–3), RAM page to write to (0–15). Status read commands returns the current status for the outstanding page grabs. The DCP 614 has access to the text header flags using the Read RAM command.

There are also additional optional filters on the Text header. They are Time Zone, Service Category, Language, and Security Element. Each of these fields can be enabled or disabled via the Filter Enable flags.

The demultiplexer 612 will set its row counter to the starting row number in the header packet. The demultiplexer 612 will not modify current data in the previous text rows. If the text page requires space characters in the previous rows then either the encoder must transmit a full page or the decoder processor 614 must issue a clear page command. The demultiplexer 612 should check for page overflow to make sure it does not write into the next text page in the RAM.

The encrypted flag indicates that the current page will be encrypted. The encryption is on a page by page basis. The processor 614 will load the demultiplexer 612 with the text decryption seed every session. When the demultiplexer 612 finds the page header, it loads the current text seed for the session and decrypts the entire page. The text data is store in the clear in RAM.

The display support controls the text data to be sent to the character generator of text processor 618. It also controls many of the display attributes requested by the DCP 614 or from the text header data.

The Character set number allows selection of more font ROMs. The 5 bit number will be used as upper address bits in addition to the 8 bit text data.

The boxed page flag tells the demultiplexer to display the page in "boxed mode". The text data must still be preceded by 2 "open box" control characters to enable the boxed area and followed by 2 "close box" control characters to disable the boxed area.

The boxed enable flag is sent via the text header. The DCP 614 can override the flag with the "debox" or "local box" bits set in the display control register.

The background of the boxed area can be selected to be either video or text. This works in conjunction with the text display on/off control bit in the display control register.

Thus, there has been shown and described a method and apparatus for transmitting a plurality of data services including low speed utility data, audio, video, teletext and optional service data via a flexible multiplex frame in accordance with the present invention. Other advantageous embodiments will come to the mind of one of ordinary skill in the art as they read the above-provided description. The described method and apparatus should only be deemed to be limited by the scope of the claims that follow.

We claim:

1. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame wherein the vertical synchronization word comprises a plurality of bytes determined in accordance with a predetermined polynomial and the vertical synchronization word for signaling a receiver identifies where to begin deinterleaving.

2. The method according to claim 1 wherein the horizontal synchronization word comprises one byte.

3. The method of claim 1 wherein said inserting step inserts the vertical synchronization word immediately following the horizontal synchronization word.

4. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frames a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame wherein the packets forming step further comprises the step of forming the multiplex structure control word, the multiplex structure control word including a plurality of fields describing the data structure of the frame and wherein the multiplex structure control word particularly includes end of data markers for each of packets data, medium speed data and high speed data.

5. The method according to claim 5 wherein the multiplex structure control word comprises the first word of interleaved data.

6. The method according to claim 4 wherein the multiplex structure control word further includes fields representing the number of bytes in each block of included medium speed or high speed data.

7. The method according to claim 4 wherein the multiplex structure control word includes fields representing the number of packets data words having a particular byte length.

8. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame wherein the packets forming step further comprises the step of forming the multiplex structure control word, the multiplex structure control word including a plurality of fields describing the data structure of the frame and wherein the multiplex structure control word particularly includes a unique indicator of the frame structure.

9. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame wherein the packets forming step further comprises the step of forming audio control packets, the audio control packets including byte counts for included medium speed data streams.

10. The method according to claim 9 wherein the packets forming step further comprises the step of forming audio service descriptor packets, the audio service descriptor packets including a medium speed data byte count for a particular medium speed data stream.

11. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame wherein the packets forming step further comprises the step of forming video control packets, the video control packets including byte counts for included high speed data streams.

12. The method according to claim 11 wherein the packets forming step further comprises the step of forming video service descriptor packets, the video service descriptor packets including a high speed data byte count for a particular high speed data stream.

13. The method according to claim 12 wherein the video service descriptor packet further includes a high definition television output flag.

14. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm;

after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame; and, encoding each row of data to be transmitted according to a forward error correction algorithm prior to interleaving wherein the forward error correction algorithm is Reed Solomon encoding and wherein the number of parity bytes inserted per row varies in direct proportion to the likelihood of data error of the transmission medium.

15. A method of transmitting digital data streams in a frame comprising rows and columns, the first row of the frame comprising a multiplex structure control word, the multiplex structure control word being followed in the frame by other packet data, the packet data being followed in the frame by medium speed data and the medium speed data being followed by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm;

after the interleaving step, inserting at least one horizontal synchronization word and at least one vertical synchronization word in accordance with noise characteristics and the capacity of a particular transmission channel over which the data streams are to be transmitted, the vertical synchronization word and the horizontal synchronization word comprising one of the first rows of the frame; and, encoding each row of data to be transmitted according to a forward error correction algorithm prior to interleaving wherein the forward error correction algorithm is Reed Solomon encoding and wherein the packets forming step further comprises the step of forming first and second regions, said first region having additional forward error correction encoding to Reed Solomon encoding and wherein the additional forward error correction encoding comprises majority logic and convolutional encoding.

16. Apparatus for encoding frames of digital data streams for transmission, the frames comprising rows and columns, the apparatus comprising at least one data compression circuit for compressing an input high speed data stream for transmission, at least one low speed data formatter for removing framing and error protection digital data from an input low speed data stream, a multiplexer, responsive to the data compression circuit and the low speed data formatter, for encoding the frames of data for transmission, the multiplexer particularly comprising an interleaving circuit for interleaving the rows and columns according to a predetermined algorithm and a synch inserter, responsive to the interleaving circuit, for inserting horizontal and vertical synchronization words into the frame wherein the vertical synchronization word signals a receiver where to begin deinterleaving.

17. An apparatus for transmitting digital data streams in a frame comprising rows and columns, the first row of the frame comprising a multiplex structure control word, the multiplex structure control word being followed in the frame by other packet data, the packet data being followed in the frame by medium speed data and by high speed data, the apparatus comprising:

at least one data compression circuit for compressing an input high speed data stream for transmission, at least one low speed data formatter for removing framing and error protection digital data from an input low speed data stream, a multiplexer, responsive to the data compression circuit and low speed data formatter, for encoding the frame of data for transmission, said multiplexer being effective to form a packets portion of the frame, a medium speed data region of the frame, and a high speed data region of the frame depending on whether low speed, medium speed, or high speed digital data streams are to be transmitted, said multiplexer being further effective to interleave the frame on a row and column basis, and, subsequently inserting horizontal synchronization words and vertical synchronization words in accordance with transmission characteristics of a particular transmission channel over which the data streams are to be transmitted, at least one of the vertical synchronization words identifying to a receiver at which said frame is to be deinterleaved.

18. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis; and, after the interleaving step, inserting at least one horizontal synchronization word and at least one vertical synchronization word in accordance with noise characteristics and the capacity of a particular transmission channel over which the data streams are to be transmitted, wherein the vertical synchronization word identifies to a receiver where to begin deinterleaving.

19. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting horizontal synchronization words and vertical synchronization words in accordance with noise characteristics and the capacity of a particular transmission channel over which the data streams are to be transmitted, wherein the packets forming step further comprises the step of forming the multiplex structure control word which includes end of data markers for at least one of the packet data, medium speed data and high speed data.

20. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting synchronization words in accordance with noise characteristics and the capacity of a particular transmission channel over which the data streams are to be transmitted, wherein the packets forming step further comprises the step of forming the multiplex structure control word which includes a unique indicator of the frame structure.

21. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting at least one of horizontal and vertical synchronization words, wherein the packets forming step farther comprises the step of forming audio control packets, the audio control packets including byte counts for included medium speed data streams.

22. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm; and, after the interleaving step, inserting at least one of horizontal and vertical synchronization words, wherein the packets forming step further comprises the step of forming video control packets, the video control packets including byte counts for included high speed data streams.

23. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm;

after the interleaving step, inserting horizontal and vertical sychronization words synchronization in accordance with noise characteristics and the capacity of a particular transmission channel over which the data streams are to be transmitted, the vertical synchronization word and the horizontal synchronization word comprising one of the first rows of the frame; and, encoding each row of data to be transmitted according to a forward error correction algorithm prior to interleaving.

24. The method according to claim 23, wherein the number of parity bytes inserted per row varies in direct proportion to the likelihood of data error of the transmission medium.

25. A method of transmitting digital data streams in a frame comprising rows and columns, the first row of the frame comprising a multiplex structure control word, the multiplex structure control word being followed in the frame by other packet data, the packet data being followed in the frame by medium speed data and by high speed data, the method comprising the steps of:

forming a packets portion of the frame, a medium speed data region of the frame and a high speed data region of the frame depending on whether low speed, medium speed or high speed digital data streams are to be transmitted;

interleaving the formed frame on a row and column basis in accordance with a predetermined algorithm;

after the interleaving step, inserting horizontal and vertical synchronization words in accordance with noise characteristics and the capacity of a particular transmission channel over which the data streams are to be transmitted, the vertical synchronization word and the horizontal synchronization word comprising one of the first rows of the frame; and, encoding each row of data to be transmitted according to a forward error correction algorithm prior to interleaving, wherein the packets forming step further comprises the step of forming first and second regions, said first region having additional forward error correction encoding comprising at least one of majority logic and convolutional encoding.

26. Apparatus for encoding frames of digital data streams for transmission, the frames comprising rows and columns, the apparatus comprising:

at least one data compression circuit for compressing an input high speed data stream for transmission, at least one low speed data formatter for removing framing and error protection digital data from an input low speed data stream, a multiplexer, responsive to the data compression circuit and the low speed data formatter, for encoding the frames of data for transmission, the multiplexer particularly comprising an interleaving circuit for interleaving the rows and columns according to a predetermined algorithm and a synch inserter, responsive to the interleaving circuit, for inserting horizontal and vertical synchronization words into the frame wherein the vertical synchronization word signals a receiver where to begin deinterleaving.

* * * * *